United States Patent
Wolfe et al.

(10) Patent No.: US 12,551,924 B2
(45) Date of Patent: Feb. 17, 2026

(54) METHOD OF APPLYING A COATING COMPOSITION TO A SUBSTRATE UTILIZING A HIGH TRANSFER EFFICIENCY APPLICATOR

(71) Applicant: AXALTA COATING SYSTEMS IP CO., LLC, Wilmington, DE (US)

(72) Inventors: Michael S. Wolfe, Wilmington, DE (US); Shih-Wa Wang, Glen Mills, PA (US); Cameron L. Stevens, Philadelphia, PA (US); Nicholas Marc Jackson, Cambridge (GB)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 18/649,735

(22) Filed: Apr. 29, 2024

(65) Prior Publication Data
US 2024/0359208 A1    Oct. 31, 2024

Related U.S. Application Data

(60) Provisional application No. 63/571,588, filed on Mar. 29, 2024, provisional application No. 63/499,141, filed on Apr. 28, 2023.

(51) Int. Cl.
*B05D 3/06*    (2006.01)
*B05D 1/02*    (2006.01)

(52) U.S. Cl.
CPC    *B05D 3/06* (2013.01); *B05D 1/02* (2013.01)

(58) Field of Classification Search
None
See application file for complete search history.

(56) References Cited

U.S. PATENT DOCUMENTS

| | | |
|---|---|---|
| 6,550,905 B1 | 4/2003 | Deckers |
| 6,861,495 B2 | 3/2005 | Barsotti et al. |
| 7,824,015 B2 | 11/2010 | Pauly |
| 8,091,987 B2 | 1/2012 | Van Den Bergen |
| 10,933,443 B2 | 3/2021 | Fritz et al. |

(Continued)

FOREIGN PATENT DOCUMENTS

| | | |
|---|---|---|
| WO | 2022067350 A1 | 3/2022 |
| WO | 2023034764 A1 | 3/2023 |
| WO | 2023044282 A1 | 3/2023 |

*Primary Examiner* — Michael P. Rodriguez
(74) *Attorney, Agent, or Firm* — Ingrassia Fisher & Lorenz, LLP

(57) ABSTRACT

A method of applying a coating composition to a substrate utilizing a high transfer efficiency applicator is disclosed and provides coated article. The high transfer efficiency applicator comprises a plurality of nozzles, each being configured to apply a stream or stream of droplets of the coating composition to a substrate substantially without atomization, and an infrared emitter. The method includes providing a coating composition for overspray-free application to the high transfer efficiency applicator, and applying the coating composition via disposing a plurality of lines of the coating composition onto the substrate via the plurality of nozzles. The method also includes irradiating the coating composition via the infrared emitter during and/or after application to give an irradiated coating composition, and thereby form an overspray free coating layer on the substrate.

20 Claims, 10 Drawing Sheets

(56) References Cited

U.S. PATENT DOCUMENTS

| | | |
|---|---|---|
| 11,117,160 B2 | 9/2021 | Fritz et al. |
| 2004/0217202 A1 | 11/2004 | Hynes |
| 2009/0304936 A1 | 12/2009 | Nakazawa |
| 2015/0124032 A1 | 5/2015 | De Mondt et al. |
| 2015/0184004 A1 | 7/2015 | Jung et al. |
| 2020/0062877 A1 | 2/2020 | Knopf et al. |
| 2020/0070182 A1 | 3/2020 | Boerner |
| 2020/0291261 A1* | 9/2020 | Moore .................. C09D 5/004 |
| 2022/0332134 A1 | 10/2022 | Wolfe et al. |
| 2022/0356359 A1 | 11/2022 | Wang et al. |
| 2022/0389231 A1* | 12/2022 | Wang .................... B05D 3/067 |

* cited by examiner

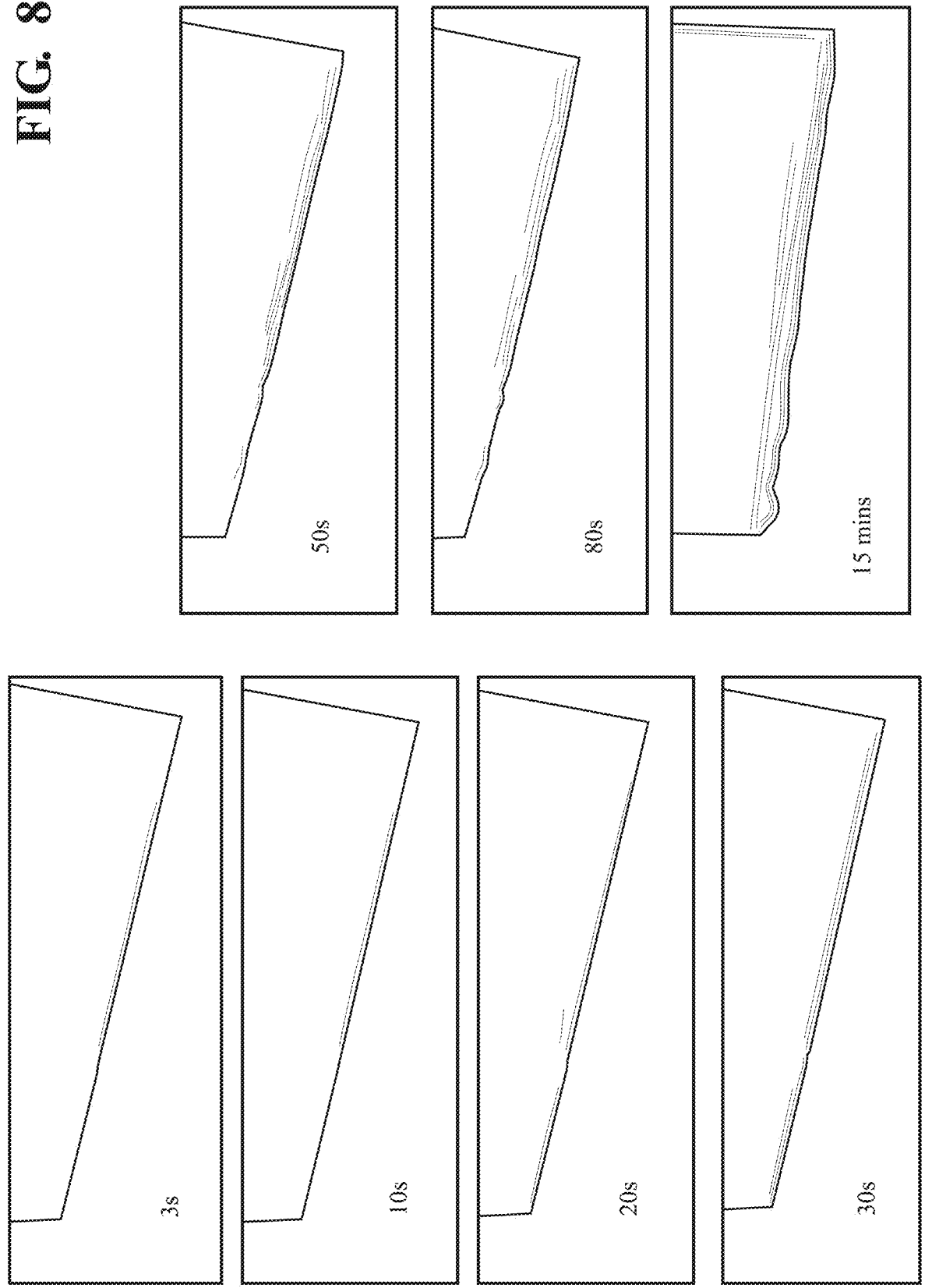

METHOD OF APPLYING A COATING COMPOSITION TO A SUBSTRATE UTILIZING A HIGH TRANSFER EFFICIENCY APPLICATOR

CROSS-REFERENCE TO RELATED APPLICATION

This application claims priority to U.S. Provisional Application No. 63/499,141, filed Apr. 28, 2023, and 63/571,588, filed Mar. 29, 2024, the contents of which are incorporated herein by reference.

FIELD OF THE DISCLOSURE

The present disclosure relates generally to a method of applying a coating composition to a substrate utilizing a high transfer efficiency applicator to form a coating layer and, more specifically, to such a process including selectively controlling solids of the coating composition during application to control flow, leveling, and sag while the coating layer is formed.

BACKGROUND

Ink jet printing is a non-impact printing process in which droplets of ink are deposited on a substrate, typically paper or textile fabrics, in response to an electronic signal. A specific application of this process, digital printing, allows for precise tailoring to individual requirements. The drops can be jetted onto the substrate by a variety of inkjet application methods including continuous and drop-on-demand printing. In drop-on-demand printing, the energy to eject a drop of ink can be from a thermal resistor, a piezoelectric crystal, acoustic or a solenoid valve. These methods use high transfer efficiency applicators.

In the automotive industry, a vehicle body is typically covered with a series of finishes each having a particular function, including an electrocoat, a primer, a colored basecoat providing the color and a clear topcoat to provide addition protection and a glossy finish. Currently, most automobile bodies are painted in a single color with the basecoat being applied in a single spray operation. The coating is applied with pneumatic spray or rotary equipment producing a broad jet of paint droplets with a wide droplet size distribution. This has the advantage of producing a uniform high-quality coating in a relatively short time by an automated process.

However, this process has a number of disadvantages. If the vehicle body is to be painted with multiple colors, for example if a second color is used for a pattern such as a stripe, or if a whole section of the vehicle body such as the roof is painted a different color, this requires masking the first coating and then passing the vehicle body through the paint spray process a second time to add the second color. After this second paint operation the masking must be removed. This is both time-consuming and labor-intensive adding significant cost to the operation.

A second disadvantage of the current spraying technology is that the drops of paint are sprayed in a wide jet of droplets which has a wide range of droplet sizes. As a result, many of the droplets do not land on the vehicle, either because they are sprayed near the edges and so overspray the substrate, or because the smaller droplets have too low a momentum to reach the vehicle body altogether. This excess overspray must be removed from the spray operation and disposed of safely, leading to significant generation of waste and also additional cost for wasted materials, clean up, disposal, etc.

Applying coatings using a high transfer efficiency applicator may provide a solution for applying two colors to a vehicle and for minimizing overspray by generating drops of a uniform size that can be directed to a specific point on the substrate, e.g. a specific location on the vehicle body, thus minimizing, or completely eliminating oversprayed droplets. In addition, digital printing can be used to print patterns or two tones on a vehicle body, either as a second color digitally printed on the top of a previously sprayed basecoat of a different color, or directly onto the primed or clearcoated vehicle substrate.

However, conventional inkjet inks have typically been formulated to print on porous substrates such as paper and textiles where the ink is rapidly absorbed into the substrate thus facilitating drying and handling of the substrate shortly after printing. In addition, although the printed articles have sufficient durability for these applications, such as printed text and pictures, or patterned fabrics, the durability requirements of an automotive coating are far greater in terms of both physical durability, such as resistance to abrasion and chipping, and long-term durability to weathering and light resistance. Furthermore, ink jet inks known in the art are formulated to have a low and generally shear-rate independent, or Newtonian, viscosity, typically below 20 cps. Such viscosity profiles are selected because of the limited amount of energy available in each nozzle of a printhead to eject a drop of ink, and also to avoid thickening of the ink in the channels of the printhead (e.g. from shear), which can lead to clogging.

By contrast, automotive coatings typically have significant non-Newtonian shear behavior with extremely high viscosity at low-shear to help avoid pigment settling and to ensure rapid and even set-up of the coating immediately after application, but relatively low viscosity at high shear rates to facilitate spraying and atomization of the spray into droplets.

Moreover, even if incumbent technology is suitable for use in some horizontal surface applications, other applications remain, such a vertical surface applications, wherein the incumbent technology sags to unacceptable levels. Since high transfer efficiency applicators demand very low viscosity with limited shear thinning behavior, standard approaches for imparting sag resistance for spray applied coatings cannot be employed.

More specifically, limitations imposed by zero-overspray applicators (continuous streams) or high resolution drop on demand (i.e., "inkjet" printheads) typically require that high shear viscosity be very low. In contrast with spray atomization, because evaporation of solvent does not occur after ejection of the paint from the applicator and prior to impacting the substrate, viscosity buildup does not occur. Consequently, coatings will sag on non-horizontal surfaces. To achieve adequate sag resistance, rheology modifiers must be incorporated at such a high level that, while sag can be prevented, a yield stress prevents flow and leveling resulting in coating defects that are unique to zero overspray applicators. These defects include nozzle line and stripe overlap visibility. The former is due incomplete flow and leveling of streams or droplets emitted from adjacent nozzles resulting in visible and parallel lines in the direction of printhead movement. The latter is a result of application of a second stripe of paint (having width of the nozzle array) adjacent to a previously applied first stripe. While changing the index (distance between adjacent stripes) can improve the coalescence, with the high levels of rheology modifier required to prevent sag, the overlap region exhibits a visible peak or valley that cannot be eliminated by index optimization. In addition, due to particle size limitations for these small nozzle applicators, some rheology control agents cannot be used due to filter and nozzle clogging. Accordingly, there remains opportunity for improvement.

BRIEF SUMMARY

A method of preparing a coated article is provided herein. The method comprises:
  providing a high transfer efficiency applicator comprising a plurality of nozzles, each being configured to apply a stream or stream of droplets of the coating composition to a substrate substantially without atomization, and an infrared emitter;
  providing a coating composition for overspray-free application to the high transfer efficiency applicator, the coating composition exhibiting an initial shear viscosity of from about 10 to 100 cP at a shear rate of 1000/s and/or an initial solids content of from about 5 to about 70%, and comprising:
  a carrier,
  a binder present in an amount of from 5 to about 70 wt. % based on a total weight of the coating composition, and
  a crosslinker present in an amount of from about 0.1 to about 25 wt. % based on a total weight of the coating composition;
  applying the coating composition with the high transfer efficiency applicator via disposing a plurality of lines of the coating composition onto the substrate via the plurality of nozzles; and
  irradiating the coating composition via the infrared emitter during and/or after application to give an irradiated coating composition that exhibits a shear viscosity greater than the initial shear viscosity and/or a solids content greater than the initial solids content.

Coating compositions and systems for use in the method are also provided, along with coated articles prepared using the method.

BRIEF DESCRIPTION OF THE DRAWINGS

The present disclosure will hereinafter be described in conjunction with the following drawing figures, wherein like numerals denote like elements and:

FIG. 8 is an illustration of a series of photographs taken over time during an assessment of the sag performance of another coating prepared in the Examples, using a forced-heat cure;

DETAILED DESCRIPTION

Figure 1A:
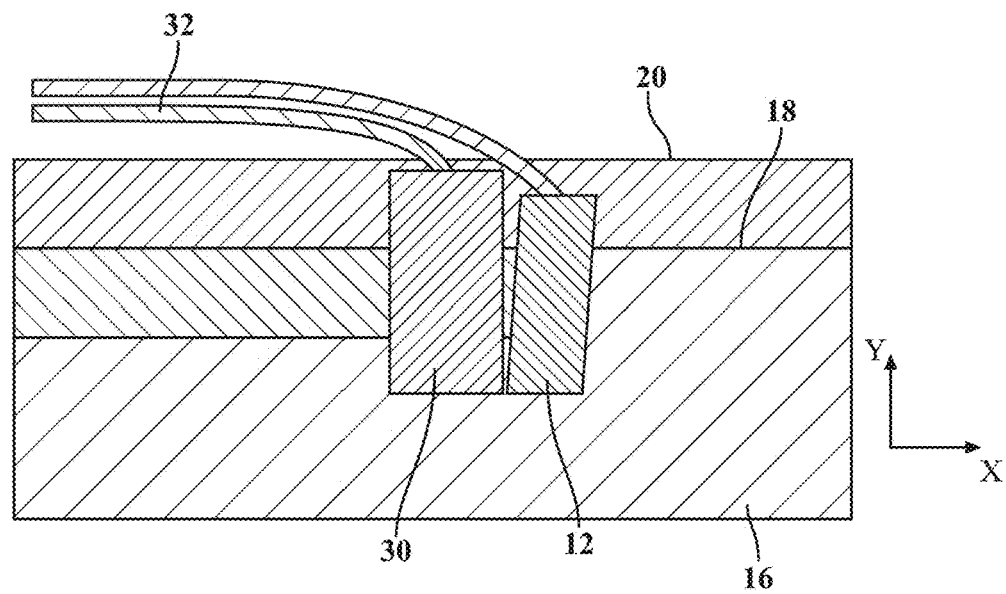
FIG. 1A is a top-view of a high transfer efficiency applicator applying a coating composition to a substrate.

The following detailed description is merely exemplary in nature and is not intended to limit the instant disclosure. Furthermore, there is no intention to be bound by any theory presented in the preceding background or the following detailed description.

In general, the present disclosure provides methods of preparing coatings and coated articles, e.g. methods of applying coating compositions onto a substrate (e.g. to form a coating thereon), coating compositions useful in the methods, and coated articles prepared by such application methods. The present disclosure further provides devices and systems for carrying out the methods and/or utilizing the coating compositions in the manner described.

For the sake of brevity, well known conventional techniques related to the compositions, methods, processes, devices, systems, and articles, as well as various portions and components thereof, may be introduced or otherwise set forth in the embodiments herein with varying levels of description. For example, conventional techniques related to formation of the coating compositions may not be described in detail herein, as the various steps in the manufacture of such compositions are well-known and will be readily understood and envisaged by those of skill in the art in view of the embodiments and examples provided herein. Similarly, various tasks and process steps described herein may be incorporated into a more comprehensive procedure or process having additional steps or functionality not otherwise described, e.g. for being well-known and readily appreciated by those of skill in the art. Such conventional steps may only be mentioned briefly or may be omitted entirely without providing well-known process details.

A method of applying a coating composition to a substrate utilizing a high transfer efficiency applicator is provided herein. The method is useful for preparing coated articles, e.g. as new manufacture, in repair or refinish applications, etc.

The method utilizes a high transfer efficiency applicator to form a coating layer disposed on the substrate. More specifically, the method comprises:

providing a high transfer efficiency applicator comprising a plurality of nozzles, each being configured to apply a stream or stream of droplets of the coating composition to a substrate substantially without atomization, and an infrared emitter;

providing a coating composition for overspray-free application to the high transfer efficiency applicator;

applying the coating composition with the high transfer efficiency applicator via disposing a plurality of lines of the coating composition onto the substrate via the plurality of nozzles; and irradiating the coating composition via the infrared emitter during and/or after application to give an irradiated coating composition, and thereby forming an overspray free coating layer on the substrate.

The coating composition for the overspray-free application (i.e., pre-application) typically exhibits an initial shear viscosity of from about 10 to 100 cP at a shear rate of 1000/s and/or an initial solids content of from about 5 to about 70%. The irradiated coating composition exhibits a shear viscosity greater than the initial shear viscosity and/or a solids content greater than the initial solids content.

The steps and components of the method are described in turn below.

The high transfer efficiency applicator itself may be any known in the art. For example, in various embodiments, the applicator is as described in one or more of patent or publication numbers US2004/0217202A1, US2009/0304936A1, US2020/0070182A1, U.S. Pat. Nos. 7,824,015B2, 8,091,987B2, or 11,117,160B2, each of which are expressly incorporated herein in their entirety for use in various non-limiting embodiments. The applicator may be alternatively described as a print head or, alternatively as comprising one or more print heads.

The method utilizes an emitter. In particular embodiments, the method utilizes an infrared emitter, i.e., a light source with a radiance comprising infrared radiation (e.g. as light or heat).

Infrared (IR) radiation will be understood as radiation comprising electromagnetic waves in the spectral range between visible red light and longer-wave microwave radiation (i.e., terahertz radiation). The IR spectrum is described by wavelengths ($\lambda$) between 780 nm and 1 mm, which correspond to a frequency range from 300 GHz to 400 THz.

In specific segments of heat-producing wavelengths, the IR spectrum includes shot-wave IR (i.e., near-IR, NIR, or IR-A) from 0.78 to 1.5 microns, which corresponds to temperatures of from thousands to many hundreds of degrees Centigrade (° C.); medium wave (i.e., medium-IR, middle-IR, MIR, or IR-B) from 1.5 to 3 microns, which corresponds to temperatures of from the high hundreds to the mid-hundreds of ° C.; and longwave infrared (i.e., far-IR, FIR, or IR-C) from 3 to 1000 microns (1 mm), which corresponds to temperatures from the mid hundreds of degrees centigrade to absolute zero. In general, the shorter the IR wavelengths radiated from the emitter, the hotter and more transmissive the irradiation. The emitter may also provide radiation outside the IR spectrum as well.

The particular type of emitter is not limited, so long as it is capable of irradiating the coating composition for the intended purpose according to the exemplary embodiments. As such, the emitter may be lamp or laser, may utilize a filament or a diode, and may be a thermal emitter or a light emitter, as well as combinations thereof. General examples include IR light emitting diodes (LEDs) and organic versions thereof (OLEDs), blackbody sources, incandescent lamps, etc.

The emitter may be adapted to provide broad-spectrum radiation to the coating composition (e.g. via use of a radiant IR heating lamp, etc.), may be adapted to provide a focused, coherent pulse of narrow-spectrum radiation (e.g. via use of a semiconductor laser, or via use of filters, blockers, etc.) in singular, regular, or periodic bursts, or various combinations thereof. Examples of combinations include the use of two types of emitters for specific irradiation methods, such as the use of a carbon-infrared radiator for passive irradiation in combination with a $CO_2$ or LED-laser for narrowly-focused irradiation.

Typically, the emitter is an infrared heat emitter, such as ceramic- or quartz-based FIR emitter, a quartz tungsten-based MIR emitter, or a quartz halogen-based NIR emitter. Other emitters may also be suitable, as will be understood in view of the description herein The form of the emitter is not limited, and will be selected based on the intended used, e.g. based on the location of the emitter relative the applicator and/or the substrate, the facility being operated in, the scale of the coating being carried out, the size of the portion of coating composition to be irradiated, etc. As such, the emitter may be in the form of a bulb or lamp, a platen with flat or curved surfaces, etc., and may be packaged with other components such as circulators, fans, blowers, etc.

The emitter may be fixed in place moveable. In some embodiments, the emitter is coupled to a print head, described in further detail below. In such embodiments, the emitter may be part of the applicator, and be fixed in place, operatively attached to a robot, etc., in relative stable proximity to the print head of the applicator. In other embodiments, the emitter is mobile (e.g. attached to a robotic arm, etc.), and the print head of the applicator is fixed in place. In such embodiments, a mobile print bed or other type of moveable support surface will typically be utilized to move the substrate relative the print head during application of the coating composition. The mobile emitter can be fixed in a position relative the print head or the print bed/table, or instead be independently mobile. Illustrative arrangements of particular embodiments are described in further detail below, relative to the illustrative figures of the drawings.

In one embodiment, the high transfer efficiency applicator includes a nozzle that defines a nozzle orifice and may have a nozzle diameter of from about 0.00002 m to about 0.0004 m. In another embodiment, the applicator may be fluidly connected to a reservoir configured to contain the coating composition. For example, the high transfer efficiency applicator may be configured to receive the coating composition from the reservoir and configured to expel the coating composition through the nozzle orifice to the substrate to form a coating layer. It is to be appreciated that ranges for the nozzle diameter, viscosity, density, surface tension, and relaxation time may be defined by any of the ranges described herein or any known in the art. In various non-limiting embodiments, all values and ranges of values, both whole and fractional, including and between the aforementioned values, are hereby expressly contemplated for use herein.

The high transfer efficiency applicator may be configured to expel the coating composition through the nozzle orifice at an impact velocity of from about 0.2 m/s to about 20 m/s. Alternatively, the high transfer efficiency applicator may be configured to expel the coating composition through the nozzle orifice at an impact velocity of from about 0.4 m/s to about 10 m/s, or alternatively at a value outside these ranges.

The nozzle orifice may have a nozzle diameter of from about 0.00004 m to about 0.00025 m. The coating composition may be expelled from the high transfer efficiency applicator as a droplet having a particle size of at least 10 microns. Alternatively, the coating composition may be expelled from the high transfer efficiency applicator in a stream.

In various embodiments, the high transfer efficiency applicator includes a plurality of nozzles with each of the nozzles defining a nozzle orifice. The plurality of the nozzles may be arranged in a linear configuration relative to one another along a first axis. For example, in various embodiments, the plurality of the nozzles includes a nozzle A and a nozzle B adjacent the nozzle A. The nozzle A and the nozzle B can be spaced from each other in a nozzle distance. The high transfer efficiency applicator distance from the substrate can be substantially the same as the nozzle distance. Likewise, it is contemplated that one, two, three, or even more applicators may be used in conjunction with each other. Each of the applicators may independently be as described herein or may be any known in the art.

In various embodiments, the high transfer efficiency applicator includes about 50 nozzles aligned along a y-axis. However, it is to be appreciated that an applicator can include any number of nozzles. Each nozzle may be actuated independent of the other nozzles to apply the coating composition to the substrate. During jetting, independent actuation of the nozzles can provide control for placement of each of the droplets of the coating composition on the substrate.

In one embodiment, the plurality of the nozzles are spaced relative to each other to form a rectangular array and wherein the plurality of the nozzles can be configured to alternate expelling of the coating composition between adjacent nozzles of the rectangular array to reduce sag of the coating composition.

Various nozzles may be utilized, so long as suitable for the type and nature of the application methods described herein, e.g. high-transfer efficiency without atomization and overspray. Examples include the nozzles described in WO2022067350A1, the content of which is incorporated by reference herein.

Two or more applicators may be coupled together, e.g. in a print head assembly. In certain embodiments, such applicators are aligned together such that the y-axis of each of the applicators are parallel to the other y-axes. Further, the nozzles of each of the applicators may be aligned with each other along an x-axis, which is perpendicular to the y-axis, such that an "array" is formed. One nozzle may be equally spaced from the other nozzles directly adjacent the one nozzle, relative to the x-axis and the y-axis. This configuration of nozzles may be suitable for applying the same coating composition by each of the applicators to the substrate as the print head assembly moves along the x-axis. Without being bound by theory, it is believed that equal spacing of the nozzles, relative to both the x-axis and the y-axis, may result in uniform application of the same coating composition on the substrate. Uniform application of the same coating composition may be suitable for single-color applications, two-tone color applications, and the like.

Alternatively, one set of nozzles along a first y-axis may be closely spaced to another set of nozzles relative to the spacing of each of the nozzles along the y-axis of a single high transfer efficiency applicator. This configuration of nozzles may be suitable for applying different coating compositions by each of the high transfer efficiency applicators to the substrate. Different coating compositions utilized within the same high transfer efficiency applicator assembly may be suitable for logos, designs, signage, striped, camouflage appearance, and the like.

The nozzles of the high transfer efficiency applicator may have any configuration known in the art, such as linear, concave relative to the substrate, convex relative to the substrate, circular, and the like. Adjustment of the configuration of the nozzles may be necessary to facilitate cooperation of the high transfer efficiency applicator to substrates having irregular configurations, such as vehicles including mirrors, trim panels, contours, spoilers, and the like.

The high transfer efficiency applicator may be configured to blend individual droplets to form a desired color. The high transfer efficiency applicator may include nozzles to apply cyan coating compositions, magenta coating compositions, yellow coating compositions, and black coating compositions. The properties of coating compositions may be modified to promote blending. Further, agitation sources, such as air movement or sonic generators may be utilized to promote blending of the coating compositions. The agitation sources may be coupled to the high transfer efficiency applicator or separate therefrom.

Identifying suitable properties of the coating composition for use in the high transfer efficiency applicator may be dependent on properties of the high transfer efficiency applicator itself. Properties of the high transfer efficiency applicator may include nozzle diameter, impact velocity of the coating composition by the high transfer efficiency applicator, speed, distance of the high transfer efficiency applicator from the substrate, droplet size of the coating composition by the high transfer efficiency applicator, firing rate of the high transfer efficiency applicator, orientation of the high transfer efficiency applicator relative to the force of gravity, and relative mobility of the print head of the application relative to the emitter and/or the substrate (or a print bed on which the substrate is disposed).

The method includes the step of providing the coating composition to the high transfer efficiency applicator. The step of providing is not particularly limited and may be any known in the art. For example, the step of providing may be describe as providing one or more components of the composition, in whole or in part, combining these components to form the composition, and then providing the completed composition. Alternatively, the step of providing may be describe as pumping, flowing, moving, or otherwise delivering one or more components of the composition or the composition as a whole to the high transfer efficiency applicator. The step of providing may be described as a continuous process or a batch process. Similarly, the step of providing may include continuous sub-steps and/or batch sub-steps. In various embodiments, the step of providing is described as pumping the composition to the applicator under pressure. The step of providing may be as understood by one of skill in the art.

A coating composition suitable for use in the method provided. The coating composition is particularly suitable for overspray-free applications and provides good appearance via suitable flow and levelling, while maintaining low sag under the conditions described. The coating composition is formulated as a fluid suitable for the jetting requirements of high transfer efficiency applicators. These and other advantages will be understood in view of the embodiments and examples provided herein.

As described in further detail below, the coating composition is not particularly limited in form ahead of application. The coating composition may be formulated and used as a one-component (i.e., "1K") composition. Alternatively, the coating composition may be a two-component (i.e., "2K") composition.

The coating composition may be a water-borne composition, or a solvent-borne composition. In specific embodiments, however, the coating composition is a 1K solvent-borne composition.

Examples of one and two-component compositions are provided below, followed by a further description of the components that compose coating compositions suitable for use in the present embodiments.

In various embodiments, the composition is, includes, consists essentially of, or consist of: a resin comprising an acrylic, a polyester, or combinations thereof; a melamine cross-linker; an optional pigment; an organic solvent; and at least one polyamide wax. For example, the terminology "consists essentially of" may describe embodiments that are free from resins or polymers not described herein or described herein as optional, cross-linkers not described herein or described herein as optional, pigments not described herein or described herein as optional, organic solvents not described herein or described herein as optional, and sag control and/or rheology control agents not described herein or described herein as optional. The terminology "free of" or "free from" may be describe that the composition includes less than about 10, 9, 8, 7, 6, 5, 4, 3, 2, 1, 0.5, or 0.1, weight percent, e.g. weight percent actives, of that compound based on a total weight of the composition. Alternatively, the terminology "free of" or "free from" may be describe that the composition is entirely free from the compound.

In various embodiments, the composition is, includes, consists essentially of, or consists of a hydroxyl-functional resin; an isocyanate cross-linker; an optional pigment; an organic solvent. For example, the terminology "consists essentially of" may describe embodiments that are free from resins or polymers not described herein or described herein as optional, cross-linkers not described herein or described herein as optional, pigments not described herein or described herein as optional, organic solvents not described herein or described herein as optional, and sag control and/or rheology control agents not described herein or described herein as optional. The terminology "free of" or "free from" may be describe that the composition includes less than about 10, 9, 8, 7, 6, 5, 4, 3, 2, 1, 0.5, or 0.1, weight percent, e.g. weight percent actives, of that compound based on a total weight of the composition. Alternatively, the terminology "free of" or "free from" may be describe that the composition is entirely free from the compound. In various non-limiting embodiments, all values and ranges of values, both whole and fractional, including and between the aforementioned values, are hereby expressly contemplated for use herein.

The one-component and two-component compositions exemplified and described above are illustrative only, and represent solvent-borne coating compositions that may be selected. However, the coating composition may be water-borne, and may be provided in other forms described herein.

In general, the coating composition comprises a binder, a crosslinker, and a carrier vehicle (e.g. a solvent, water, etc.), and is not particularly limited aside from the requirement of being printable under the method set forth herein, and tolerant to the specific steps thereof.

The term "binder" typically refers to film forming constituents of the coating composition. It will be understood that such binders can include specific polymers, oligomers, or combinations thereof that are often essential for forming coatings having desired properties, such as hardness, protection, adhesion, etc. Additional components, such as carriers, pigments, catalysts, rheology modifiers, antioxidants, UV stabilizers and absorbers, leveling agents, antifoaming agents, anti-cratering agents, or other conventional additives are typically not included in the term "binder" unless any of these additional components are film-forming constituents themselves. However, one or more of those additional components can be included in the coating composition as described below.

The binder is not particularly limited, and may comprise any suitable resin known and used in the type of coating compositions presented herein, e.g. solvent borne basecoats, monocoats, etc. For example, the resin may comprise an acrylic, a polyester, or combinations thereof. Alternatively, the composition, and/or the resin itself, may include a polyester and be free of an acrylic and/or any other polymer. The composition and/or the resin itself may include both an acrylic and a polyester and be free of any other polymer.

In various embodiments, the acrylic may be, include, consist essentially of, or consist of the reaction product of one or more of the following monomers including, but not limited to, (meth)acrylamide, N-substituted (meth)acrylamide, octyl(meth)acrylate, nonylphenol ethoxylate(meth)acrylate, isononyl(meth)acrylate, 1,6-hexanediol(meth)acrylate, isobornyl(meth)acrylate, 2-(2-ethoxyethoxy)ethyl(meth)acrylate, 2-ethylhexyl(meth)acrylate, lauryl(meth)acrylate, beta-carboxyethyl(meth)acrylate, isobutyl(meth)acrylate, cycloaliphatic epoxide, alpha-epoxide, 2-hydroxyethyl(meth)acrylate, (meth)acrylonitrile, maleic anhydride, itaconic acid, isodecyl(meth)acrylate, dodecyl(meth)acrylate, n-butyl(meth)acrylate, methyl(meth)acrylate, hexyl(meth)acrylate, (meth)acrylic acid, N-vinylcaprolactam, stearyl(meth)acrylate, hydroxy functional caprolactone ester(meth)acrylate, octodecyl(meth)acrylate, isooctyl(meth)acrylate, hydroxyethyl(meth)acrylate, hydroxymethyl(meth)acrylate, hydroxypropyl(meth)acrylate, hydroxyisopropyl(meth)acrylate, hydroxybutyl(meth)acrylate, hydroxyisobutyl(meth)acrylate, tetrahydrofurfuryl(meth)acrylate, combinations of these, and the like.

In other embodiments, the acrylic may be, include, consist essentially of, or consist of one or more of (meth)acrylated urethanes (i.e., urethane(meth)acrylates), (meth)acrylated epoxies (i.e., epoxy(meth)acrylates), (meth)acrylated polyesters (i.e., polyester(meth)acrylates), (meth)acrylated (meth)acrylics, (meth)acrylated silicones, (meth)acrylated amines, (meth)acrylated amides; (meth)acrylated polysulfones; (meth)acrylated polyesters, (meth)acrylated polyethers (i.e., polyether (meth)acrylates), vinyl(meth)acrylates, and (meth)acrylated oils.

In various embodiments, the polyester may be, include, consist essentially of, or consist of, any polyester known in the art. For example, the polyester may be linear or branched. Useful polyesters can include esterification products of aliphatic or aromatic dicarboxylic acids, polyols, diols, aromatic or aliphatic cyclic anhydrides and cyclic alcohols. Non-limiting examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenchexahydrophthalic acid, camphoric acid, cyclohexanetetracarboxylic, and cyclobutanctetracarboxylic acid. The cycloaliphatic polycarboxylic acids can be used not only in their cis but also in their trans form and as a mixture of both forms. Further non-limiting examples of suitable polycarboxylic acids can include aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid. Combinations of polyacids, such as a combination of polycarboxylic acids and cycloaliphatic polycarboxylic acids can be suitable. Combinations of polyols can also be suitable.

Non-limiting examples of suitable polyesters include a branched copolyester polymer. The branched copolyester polymer and process for production described in U.S. Pat. No. 6,861,495B2, the content of which is hereby incorporated by reference, can be suitable. Monomers with multifunctional groups such as AxBy (x,y=1 to 3, independently) types including those having one carboxyl group and two hydroxyl groups, two carboxyl groups and one hydroxyl group, one carboxyl group and three hydroxyl groups, or three carboxyl groups and one hydroxyl group can be used to create branched structures. Non-limiting examples of such monomers include 2,3 dihydroxy propionic acid, 2,3 dihydroxy 2-methyl propionic acid, 2,2 dihydroxy propionic acid, 2,2-bis (hydroxymethyl) propionic acid, and the like.

The polyester can be conventionally polymerized from a monomer mixture containing a chain extender selected from the group of a hydroxy carboxylic acid, a lactone of a hydroxy carboxylic acid, and a combination thereof; and one or more branching monomers. Some of the suitable hydroxy carboxylic acids include glycolic acid, lactic acid, 3-hydroxypropionic acid, 3-hydroxybutyric acid, 3-hydroxyvaleric acid, and hydroxypyvalic acid. Some of the suitable lactones include caprolactone, valerolactone; and lactones of the corresponding hydroxy carboxylic acids, such as, e.g., 3-hydroxypropionic acid, 3-hydroxybutyric acid, 3-hydroxyvaleric acid, and hydroxypyvalic acid. In certain embodiments, caprolactone can is utilized. In embodiments, the branched copolyester polymer can be produced by polymerizing, in one step, the monomer mixture that includes the chain extender and hyper branching monomers, or by first polymerizing the hyper branching monomers followed by polymerizing the chain extenders. It is to be appreciated that the branched copolyester polymer can be formed from acrylic core with extending monomers described above.

In various embodiments, the resin comprising an acrylic, a polyester, or combinations thereof is utilized in an amount of from about 10 to about 40, about 15% to about 35%, or about 20% to about 30%, weight percent based on a total weight percent of the coating composition.

The composition typically includes a cross-linker. The term "crosslinker" refers to a component having "crosslinking-functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable-functional groups (during the curing step) to produce a coating in the form of crosslinked structures. One of ordinary skill in the art would recognize that certain combinations of crosslinking-functional group and crosslinkable-functional groups would be excluded, since they would fail to crosslink and produce the film forming crosslinked structures.

In some embodiments, the coating composition comprises an isocyanate crosslinker, a melamine crosslinker, or both.

The isocyanate cross-linker is not particularly limited and may be any known in the art. In various embodiments, this isocyanate cross-linker may be, include, consist essentially of, or consist of, one or more isocyanates such as, but not limited to, aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of two molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanate.

In various embodiments, isocyanates such as, for example, oligomers based on hexamethylene diisocyanate (HDI), diphenylmethane diisocyanate (MDI), isophorone diisocyanate (IPDI), or toluidine diisocyanate (TDI), e.g. isocyanurates, biuret, allophanates, and adducts of the isocyanates mentioned with polyhydric alcohols and mixtures thereof can be used. These can react with polyols such as, for example, OH group-containing polyesters, polyethers, acrylates and polyurethane, and mixtures thereof, which polyols may be solvent-based, solvent-free, or water-dilutable. In various embodiments, monofunctional isocyanates are contemplated for use herein, as selected by one of skill in the art. In other embodiments, blocked isocyanates are contemplated for use herein, as selected by one of skill in the art.

In various embodiments, the isocyanate cross-linker is utilized in an amount of from about 3 to about 6 or about 3, 4, 5, or 6, weight percent based on a total weight of the coating composition.

In various embodiments, an isocyanate cross-linker is not used and a melamine cross-linker is used. Alternatively, both an isocyanate cross-linker and a melamine cross-linker can be used. In various embodiments, this optionally cross-linker may be, include, consist essentially of, or consist of, any melamine cross-linker known in the art.

Melamine resins may be partially or fully etherified with one or more alcohols like methanol or butanol. A non-limiting example is hexamethoxymethyl melamine. Non-limiting examples of suitable melamine resins include monomeric melamine, polymeric melamine-formaldehyde resin, or a combination thereof. The monomeric melamines include low molecular weight melamines which contain, on an average, three or more methylol groups etherized with a C1 to C5 monohydric alcohol such as methanol, n-butanol, or isobutanol per triazine nucleus, and have an average degree of condensation up to about 2 and, in certain embodiments, in the range of from about 1.1 to about 1.8, and have a proportion of mononuclear species not less than about 50 percent by weight. By contrast the polymeric melamines have an average degree of condensation of more than about 1.9. Some such suitable monomeric melamines include alkylated melamines, such as methylated, butylated, isobutylated melamines and mixtures thereof. Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327, 370 and XW3106, which are all monomeric melamines. Suitable polymeric melamines include high amino (partially alkylated, —N, —H) melamine known as Resimene® BMP5503 (molecular weight 690, polydispersity of 1.98, 56% butyl, 44% amino), which is supplied by Solutia Inc., St. Louis, Mo., or Cymel® 1158 provided by Cytec Industries Inc., West Patterson, N.J. Cytec Industries Inc. also supplies Cymel® 1130@80 percent solids (degree of polymerization of 2.5), Cymel® 1133 (48% methyl, 4% methylol and 48% butyl), both of which are polymeric melamines. In various non-limiting embodiments, all values and ranges of values, both whole and fractional, including and between the aforementioned values, are hereby expressly contemplated for use herein.

The coating composition may include more than one type of crosslinking agent that have the same or different crosslinking-functional groups. Typical crosslinking-functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide, or combinations thereof.

In various embodiments, the optional cross-linker, e.g. a melamine cross-linker, is utilized in an amount of from about 0 to about 30, about 5 to about 30, about 12 to about 25, or about 15 to about 20, weight percent based on a total weight percent of the composition. In other embodiments, this amount is from about 5 to about 25, about 10 to about 20, about 10 to about 15, weight percent based on a total weight percent of the composition.

In exemplary embodiments, the coating composition includes a melamine-formaldehyde resin having the tradename Cymel® 303 which is commercially available from Cytec Industries Inc. of West Patterson, N.J.

The coating composition is typically a suspension of the film-forming components and optional additives, and thus generally comprises a carrier vehicle, e.g. a solvent or fluid. The carrier vehicles is typically water based or solvent based, i.e., the coating composition is typically a water-borne composition or a solvent-borne composition. The formulations of such carrier vehicles are known in the art, and will be understood best in view of the examples and description herein.

In some embodiments, the solvent is an organic solvent. Examples of suitable organic solvents can include aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate, and the like. Some specific examples include methanol, ethanol, isopropanol, n-butanol, 2-butanol, tridecyl alcohol, methyl isobutyl ketone, methyl ethyl ketone, 3-butoxy-2-propanol, ethyl 3-ethoxypropionate, butyl glycol, butyl glycol acetate, butanol, dipropylene glycol methyl ether, diethylene glycol monobutyl ether, butyl glycolate, hexane, heptane, octane, toluene, xylene, ethyl acetate, propyl acetate, isopropyl acetate, butyl acetate, isobutyl acetate, 2-butoxyethyl acetate, amyl acetate, isoamyl acetate, diethylene glycol butyl ether acetate, acetone, xylene, toluene. Typically, however, the coating composition is substantially free from highly volatile solvents, as well as any other types that would interfere with the type of applicator and application processes described herein. In embodiments, the evaporation rate of the solvent may have an impact on the suitability of the coating composition for printing.

In certain embodiments, the coating composition comprises water as the carrier.

Certain cosolvents may be incorporated into the coating composition having increased or decreased evaporation rates, thus providing a handle for selective tailoring of the rheology profile of the composition during and after application to the substrate. This application is described further below.

In various embodiment, the organic solvent content is greater than about 50 wt. %, alternatively greater than 60 wt. %, alternatively greater than 70 wt. %, alternatively greater than 80 wt. %, or alternatively greater than 90 wt. %, based on a total weight of liquid carrier in the coating composition. In these or other embodiments, any one solvent or carrier vehicle may be present in the coating composition in any suitable amount, e.g. from about 5 to about 70 wt. %, such as from about 10 about 65 wt. %, based on the total weight of the coating composition. The total amount of carrier utilized will depend on the type of composition (i.e., water-borne or solvent-borne), and will be understood in view of the solids content ranges provided herein.

The coating composition can include various components, such as binders, dyes, rheology modifiers, carriers, catalysts, conventional additives, or combinations thereof. Conventional additives may include, but are not limited to, dispersants, antioxidants, UV stabilizers and absorbers, surfactants, wetting agents, leveling agents, antifoaming agents, anti-cratering agents, or combinations thereof. In embodiments, the coating composition is suitable for application to the substrate utilizing the high transfer efficiency applicator on the basis that the coating composition includes certain components and/or includes certain components in a specific amount/ratio.

Any pigment known in the art for use in coating compositions may be utilized in the coating composition, provided it be compatible with the other components selected and the applicator being utilized. Non-limiting examples of suitable pigments include metallic oxides, metal hydroxide, effect pigments including metal flakes, chromates, such as lead chromate, sulfides, sulfates, carbonates, carbon black, silica, talc, china clay, phthalocyanine blues and greens, organo reds, organo maroons, pearlescent pigments, other organic pigments and dyes, and combinations thereof. If desired, chromate-free pigments, such as barium metaborate, zinc phosphate, aluminum triphosphate and combinations thereof, can also be utilized.

Further non-limiting examples of suitable effect pigments include bright aluminum flake, extremely fine aluminum flake, medium particle size aluminum flake, and bright medium coarse aluminum flake; mica flake coated with titanium dioxide pigment also known as pearl pigments; and combinations thereof. Non-limiting examples of suitable colored pigments include titanium dioxide, zinc oxide, iron oxide, carbon black, mono azo red toner, red iron oxide, quinacridone maroon, transparent red oxide, dioxazine carbazole violet, iron blue, indanthrone blue, chrome titanate, titanium yellow, mono azo permanent orange, ferrite yellow, mono azo benzimidazolone yellow, transparent yellow oxide, isoindoline yellow, tetrachloroisoindoline yellow, anthanthrone orange, lead chromate yellow, phthalocyanine green, quinacridone red, perylene maroon, quinacridone violet, pre-darkened chrome yellow, thio-indigo red, transparent red oxide chip, molybdate orange, molybdate orange red, and combinations thereof.

As also introduced above, the coating composition may further include extender pigments. While extender pigments are generally utilized to replace higher cost pigments in coating compositions, the extender pigments as contemplated herein may increase shear viscosity of the coating composition as compared to a coating composition free of the extender pigments. An increase in shear viscosity of the coating composition may improve suitability of the coating composition for application to the substrate utilizing the high transfer efficiency applicator. The extender pigment may have a particle size of from about 0.01 to about 44 microns. The extender pigment may have a variety of configurations including, but not limited to, nodular, platelet, acicular, and fibrous. Non-limiting examples of suitable extender pigments include whiting, barytes, amorphous silica, fumed silica, diatomaceous silica, china clay, calcium carbonate, phyllosilicate (mica), wollastonite, magnesium silicate (talc), barium sulfate, kaolin, and aluminum silicate. In various non-limiting embodiments, all values and ranges of values, both whole and fractional, including and between the aforementioned values, are hereby expressly contemplated for use herein.

The coating composition may include the extender pigment in an amount of from about 0.1 to about 50, alternatively from about 1 to about 20, or alternatively from about 1 to about 10, wt. %, based on a total weight of the coating composition. In certain embodiments, the coating composition includes magnesium silicate (talc), barium sulfate, or a combination thereof. In various embodiments, inclusion of barium sulfate as the extender pigment results in a coating composition having greater shear viscosity as compared to inclusion of talc as the extender pigment. In various non-limiting embodiments, all values and ranges of values, both whole and fractional, including and between the aforementioned values, are hereby expressly contemplated for use herein.

In various embodiments, the optional pigment is chosen from Pigment Yellow 213, PY 151, PY 93, PY 83, Pigment Red 122, PR 168, PR 254, PR 179, Pigment Red 166, Pigment Red 48:2, Pigment Violet 19, Pigment Blue 15:1, Pigment Blue 15:3, Pigment Blue 15:4, Pigment Green 7, Pigment Green 36, Pigment Black 7 or Pigment White 6, and combinations thereof.

In various embodiments, the coating composition may further include dyes. Non-limiting examples of suitable dyes include triphenylmethane dyes, anthraquinone dyes, xanthene and related dyes, azo dyes, reactive dyes, phthalocyanine compounds, quinacridone compounds, and fluorescent brighteners, and combinations thereof. The coating composition may include the dye in an amount of from about 0.01 to about 5, alternatively from about 0.05 to about 1, or alternatively from about 0.05 to about 0.5, wt. %, based on a total weight of the coating composition. In certain embodiments, the coating composition includes a 10% black dye solution, such as Sol. Orasol Negro RL.

The coating composition may be substantially free of a dye. The term "substantially" as utilized herein means that the coating composition may include insignificant amounts of dye such that the color and/or properties of the coating composition are not impacted by the addition of the insignificant amount of the dye which still being considered substantially free of a dye. In embodiments, the coating composition being substantially free of a dye includes no greater than 5 wt. %, alternatively no greater than 1 wt. %, or alternatively no greater than 0.1 wt. %.

As also introduced above, the coating composition may further include a catalyst. The coating composition may further include a catalyst to reduce curing time and to allow curing of the coating composition at specific temperatures. Non-limiting examples of suitable catalysts may include organic metal salts, such as, dibutyl tin dilaurate, dibutyl tin diacetate, dibutyl tin dichloride, dibutyl tin dibromide, zinc naphthenate; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts and other catalysts, or a combination thereof. Non-limiting examples of suitable acid catalysts may include carboxylic acids, sulfonic acids, phosphoric acids or a combination thereof. In some embodiments, the acid catalyst can include, for example, acetic acid, formic acid, dodecyl benzene sulfonic acid, dinonyl naphthalene sulfonic acid, para-toluene sulfonic acid, phosphoric acid, or a combination thereof.

The coating composition may include the catalysts in an amount of from about 0.01 to about 5, alternatively from about 0.05 to about 1, or alternatively from about 0.05 to about 0.5, wt. %, based on a total weight of the coating composition. In various non-limiting embodiments, all values and ranges of values, both whole and fractional, including and between the aforementioned values, are hereby expressly contemplated for use herein.

The coating composition may further include an ultraviolet light stabilizer or antioxidant. Non-limiting examples of such ultraviolet light stabilizers include ultraviolet light absorbers, screeners, quenchers, and hindered amine light stabilizers. An antioxidant can also be added to the coating composition. Typical ultraviolet light stabilizers can include benzophenones, triazoles, triazines, benzoates, hindered amines and mixtures thereof. A blend of hindered amine light stabilizers, such as Tinuvin® 328 and Tinuvin® 123, all commercially available from Ciba Specialty Chemicals of Tarrytown, New York, under the trade name Tinuvin®, can be utilized.

Non-limiting examples of suitable ultraviolet light absorbers include hydroxyphenyl benzotriazoles, such as, 2-(2-hydroxy-5-methylphenyl)-2H-benzotrazole, 2-(2-hydroxy-3,5-di-tert. amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2, -hydroxy-3-dodecyloxy/tridecyloxypropyl)-oxy)-2-hydroxyphenyl]-4,6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl) 1,3,5-triazine, 2-(4-octyloxy-2-hydroxyphenyl)-4,6-bis (2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Non-limiting examples of suitable hindered amine light stabilizers include N-(1,2,2,6,6-pentamethyl-4-piperidinyl)-2-dodecyl succinimide, N(lacetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis [butyl(1,2,2,6,6-pentamethyl-4-piperidinyl)amino]-1,3,5-triazine-2-yl]imino]-3,1-propanediyl]]bis[N,N'''-dibutyl-N', N'''-bis (1,2,2,6,6-pentamethyl-4-piperidinyl)], poly-[[6-[1, 1,3,3-tetramethylbutyl)-amino]-1,3,5-trianzine-2,4-diyl][2, 2,6,6-tetramethylpiperidinyl)-imino]-1,6-hexane-diyl[(2,2, 6,6-tetramethyl-4-piperidinyl)-imino]), bis(2,2,6,6-tetramethyl-4-piperidinyl)sebacate, bis(1,2,2,6,6- pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxyphenyl) methyl]butyl propanedioate, 8-acetyl-3-dodecyl-7,7,9,9, -tetramethyl-1,3,8-triazaspiro(4,5)decane-2,4-dione, and dodecyl/tetradecyl-3-(2,2,4,4-tetramethyl-21-oxo-7-oxa-3,20-diazal dispiro(5.1.11.2)henicosan-20-yl)propionate.

Non-limiting examples of suitable antioxidants include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6 (1H,3H,5H)-trione and benzenepropanoic acid, 3,5-bis(1,1-dimethyl-ethyl)-4-hydroxy-C7-C9 branched alkyl esters. In certain embodiments, the antioxidant includes hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168 from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals, and Doverphos® S-9228 from Dover Chemicals.

The coating compositions may further include wetting agents, leveling and flow control agents, etc. For example, Resiflow® S (polybutylacrylate), BYK® 320 and 325 (high molecular weight polyacrylates), BYK® 347 (polyether-modified siloxane) under respective trade names, leveling agents based on (meth)acrylic homopolymers; rheological control agents; thickeners, such as partially crosslinked polycarboxylic acid or polyurethanes; and antifoaming agents. The other additives can be used in conventional amounts familiar to those skilled in the art. In embodiments, the wetting agents, leveling agents, flow control agents, and surfactants of the coating composition can affect the surface tension of the coating composition and thus may have an impact on the suitability of the coating composition for printing. Certain wetting agents, leveling agents, flow control agents, and surfactants may be incorporated into the coating composition for increasing or decreasing the surface tension of the coating composition.

In various embodiments, the composition is free of, or includes less than about 10, 9, 8, 7, 6, 5, 4, 3, 2, 1, 0.5, or 0.1, weight percent of a sag control agent based on a total weight of the composition.

In some embodiments, a sag control agent is utilized in the coating composition. Examples of such sag control agents can be found in US20220332134A1, US20220356359A1, and WO2023034764A1, the contents of which are hereby incorporated by reference.

Particle Size in the Coating Composition

In various embodiments, the coating composition is free of any component that has an average particle size greater than about 10% of a nozzle diameter of a nozzle being used with the applicator. For example, high transfer efficiency "stream on demand" or "drop on demand" applicators generally include an array of fine diameter nozzles that each has a nozzle diameter of about 20 microns to 200 microns. It is typically expected for reliable fluid jetting that the particle size of any ingredient of the coating composition must be no bigger than 10% of the nozzle diameter.

In various embodiments, the composition is free of a clay and silica. The terminology "free of" may describe that the composition includes less than 10, 9, 8, 7, 6, 5, 4, 3, 2, 1, 0.5, or 0.1, weight percent of the clay and/or silica based on a total weight of the composition. Alternatively, the composition may be completely free of the clay or silica. The clay is not particularly limited and may be clay particles surface functionalized with quaternary amines. Similarly, the silica is not particularly limited and may be organophilic phyllosilicates, amorphous silica such as CAS:92797-60-9, AEROSIL R-805 VV90, and combinations thereof. In various non-limiting embodiments, all values and ranges of values, both whole and fractional, including and between the aforementioned values, are hereby expressly contemplated for use herein.

In some embodiments, the coating composition has a particular solids content, as indicated by the relative component amounts provided above. It will be appreciated from these and other embodiments described herein that a higher solids content for the coating composition may typically be desired due to the coating composition not undergoing atomization as with other method utilizing conventional spray equipment. In the present embodiments, because of the "assist" provided by the emitter utilized in the method, a lower initial solids content may be utilized (e.g. to improve flow, leveling, jettability, etc.) in the method. Typically, the particular solids content or the coating composition will be selected in view of the other components present in the coating composition and used in the method.

In some embodiments, the coating composition is a solvent borne composition having an initial solids content of from about 25% to about 60%, such as from about 27% to about 55%, alternatively from about 30% to about 50%. In other embodiments, the coating composition is a waterborne composition having an initial solids content of from about 5% to about 45%, such as from about 8% to about 35%.

In some embodiments, the coating composition has a particular viscosity, such as a particular shear or complex viscosity, or another rheological property. One of skill in the art will appreciate the factors that influence the viscosity of the composition, including those involved in the method, as well as methods for determining particular viscosity and related values (e.g. ASTM 2196, etc.). Exemplary ranges and values for these properties are described further below.

In view of the various properties of the coating composition and the high transfer efficiency applicator utilized with the same, one or more relationships may be established between such properties for forming the coating composition having properties suitable for application, particularly with respect to application utilizing the high transfer efficiency applicator. For example, various equations may be applied to, derived from, and/or used to describe one or more of these properties of the coating composition and the high transfer efficiency applicator, e.g. to determine boundaries for properties rendering the coating composition suitable for application and/or use. In certain embodiments, the boundaries for the properties of the coating composition may be determined by establishing an Ohnesorge number (Oh) for the coating composition, a Reynolds number (Re) for the coating composition, a Deborah number (De) for the coating composition, or combinations thereof.

The Ohnesorge number (Oh) is a dimensionless constant that generally relates to the tendency for a drop of the coating composition, upon contact with the substrate, to either remain as a single drop or separate into many droplets (i.e., satellite droplets), by considering viscous and surface tension forces of the coating composition. The Ohnesorge number (Oh) may be determined in accordance with Equation I, as follows:

$$Oh = \left(\eta / \sqrt{\rho \sigma D}\right)$$

(I), wherein η represents viscosity of the coating composition in pascal-seconds (Pa*s), ρ represents density of the coating composition in kilograms per cubic meter (kg/m3), σ represents surface tension of the coating composition in newtons per meter (N/m), and D represents nozzle diameter of the high transfer efficiency applicator in meters (m). The Ohnesorge number (Oh) may be in a range of from about 0.01 to about 50, alternatively from about 0.05 to about 10, or alternatively from about 0.1 to about 2.70. The Ohnesorge number (Oh) may be at least 0.01, alternatively at least 0.05, or alternatively at least 0.1. The Ohnesorge number (Oh) may be no greater than 50, alternatively no greater than 10, or alternatively no greater than 2.70.

The Reynolds number (Re) is a dimensionless constant that generally relates to the flow pattern of the coating composition and, in certain embodiments, relates to flow patterns extending between laminar flow and turbulent flow by considering viscous and inertial forces of the coating composition. The Reynolds number (Re) may be determined in accordance with Equation II, as follows:

$$Re = (\rho v D / \eta)$$

(II), wherein ρ represents density of the coating composition in kg/m³, v represents impact velocity of the high transfer efficiency applicator in meters per second (m/s), D represents nozzle diameter of the high transfer efficiency applicator 12 in m, and η represents viscosity of the coating composition in Pa*s. The Reynolds number (Re) may be in a range of from about 0.01 to about 1,000, alternatively from about 0.05 to about 500, or alternatively from about 0.34 to about 258.83. The Reynolds number (Re) may be at least 0.01, alternatively at least 0.05, or alternatively at least 0.34. The Reynolds number (Re) may be no greater than 1,000, alternatively no greater than 500, or alternatively no greater than 258.83.

The Deborah number (De) is a dimensionless constant that generally relates to the elasticity of the coating composition and, in certain embodiments, relates to structure of a visco-elastic material by considering relaxation time of the coating composition. The Deborah number (De) may be determined in accordance with Equation III, as follows:

$$De = \lambda / \sqrt{\rho D^3 / \sigma}$$

(III), wherein λ represents relaxation time of the coating composition in seconds(s), ρ represents density of the coating composition in kg/m³, D represents nozzle diameter of the high transfer efficiency applicator 12 in m, and σ represents surface tension of the coating composition in N/m. The Deborah number (De) may be in a range of from about 0.01 to about 2,000, alternatively from about 0.1 to about 1,000, or alternatively from about 0.93 to about 778.77. The Deborah number (De) may be at least 0.01, alternatively at least 0.1, or alternatively at least 0.93. The Deborah number (De) may be no greater than 2,000, alternatively no greater than 1,000, or alternatively no greater than 778.77.

In various embodiments, the Deborah number (De) may be from greater than about zero up to about 0.01, of from greater than about zero up to about 0.009, of from greater than about zero up to about 0.008, of from greater than about zero up to about 0.007, of from greater than about zero up to about 0.006, of from greater than about zero up to about 0.005, of from greater than about zero up to about 0.004, of from greater than about zero up to about 0.003, of from greater than about zero up to about 0.002, of from greater than about zero up to about 0.001, of from about 0.001 to about 0.009, about 0.002 to about 0.008, about 0.003 to about 0.007, about 0.004 to about 0.006, or from about 0.004 to about 0.005. In various non-limiting embodiments, all values and ranges of values above, including both whole and fractional values therebetween, are hereby expressly contemplated for use herein.

The Weber number (We) is a dimensionless constant that generally relates to fluid flows where there is an interface between two different. The Weber number (We) may be determined in accordance with Equation IV, as follows:

$$We = \left(Dv^2 \rho\right) / \sigma$$

(IV), wherein D represents nozzle diameter of the high transfer efficiency applicator 12 in m, v represents impact velocity of the high transfer efficiency applicator in meters per second (m/s), ρ represents density of the coating composition in kg/m³, and σ represents surface tension of the coating composition in N/m.

The Weber number (We) may be in a range of from greater than 0 to about 16,600, alternatively from about 0.2 to about 1,600, or alternatively from about 0.2 to about 10. The Weber number (We) may be at least 0.01, alternatively at least 0.1, or alternatively at least 0.2. The Weber number (We) may be no greater than 16,600, alternatively no greater than 1,600, or alternatively no greater than 10.

In general embodiments, the coating composition may have an Ohnesorge number (Oh) of from about 0.01 to about 12.6, alternatively from about 0.05 to about 1.8, or alternatively about 0.38. In these or other embodiments, the coating composition may have a Reynolds number (Re) of from about 0.02 to about 6,200, alternatively from about 0.3 to about 660, or alternatively about 5.21. In these or other embodiments, the coating composition may have a Deborah number (De) of from greater than 0 to about 1730, alternatively from greater than 0 to about 46, or alternatively about 1.02. In these or other embodiments, the coating composition may have a Weber number (We) of from greater than 0 to about 16,600, alternatively from about 0.2 to about 1,600, or alternatively about 3.86.

In view of one or more of the equations described above, the coating composition may exhibit a density (ρ) in an amount of from about 700 to about 1500, alternatively from about 800 to about 1400, or alternatively from about 1030 to about 1200, kilograms per cubic meter (kg/m³). The coating composition may exhibit a density (ρ) in an amount of at least 700, alternatively at least 800, or alternatively at least 1030, kg/m³. The coating composition may exhibit a density (ρ) in an amount of no greater than 1500, alternatively no greater than 1400, or alternatively no greater than 1200, kg/m³. The density (ρ) may be determined in accordance with ASTM D1475.

The coating composition may exhibit a surface tension (σ) in an amount of from about 0.001 to about 1, alternatively from about 0.01 to about 0.1, or alternatively from about 0.024 to about 0.05, newtons per meter (N/m). The coating composition may exhibit a surface tension (σ) in an amount of at least 0.001, alternatively at least 0.01, or alternatively at least 0.015, N/m. The coating composition may exhibit a surface tension (σ) in an amount of no greater than 1, alternatively no greater than 0.1, or alternatively no greater than 0.05, N/m. The surface tension (σ) may be determined in accordance with ASTM D1331-14.

The coating composition may exhibit a relaxation time (λ) in an amount of from about 0.00001 to about 1, alternatively from about 0.0001 to about 0.1, or alternatively from about 0.0005 to about 0.01, seconds(s). The coating composition may exhibit a relaxation time (λ) in an amount of at least 0.00001, alternatively at least 0.0001, or alternatively at least 0.01, s. The coating composition may exhibit a relaxation time (λ) in an amount of no greater than 1, alternatively no greater than 0.1, or alternatively no greater than 0.01, s. The relaxation time (λ) may be determined by a stress relaxation test performed in a strain controlled rheometer. In such a test, a sample of viscoelastic fluid (e.g. the coating composition) is held between parallel plates, and an instantaneous strain is applied to one side of the sample. The other side is held constant while stress (proportional to torque) is being monitored. The resulting stress decay is measured as a function of time yielding stress relaxation modulus (i.e., stress divided by applied strain). For many fluids, stress relaxation modulus decays in an exponential fashion with relaxation time as the decay constant.

The coating composition may be utilized to coat any type of substrate known in the art, so long as the conditions of the method may be achieved (i.e., whereby the coating composition may be irradiated with the emitter, etc.). As such, and as described further below, it will be appreciated that the term "substrate" is used to generally refer to the article to be coated, and not strictly the surface onto which the coating will be applied (i.e., as that surface will bear the irradiated coating composition, the layer formed therefrom, etc., as described herein).

In embodiments, the substrate is a vehicle, automobile, or automobile vehicle. A "vehicle" or "automobile" or "automobile vehicle" includes an automobile, such as, car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport. The coating composition may also be utilized to coat substrates in industrial applications such as buildings; fences; ceramic tiles; stationary structures; bridges; pipes; cellulosic materials (e.g., woods, paper, fiber, etc.). The coating composition may also be utilized to coat substrates in consumer products applications such as helmets; baseball bats; bicycles; and toys. It is to be appreciated that the term "substrate" as utilized herein can also refer to a coating layer disposed on an article that is also considered a substrate. In this fashion, the method may comprise wet-on-wet or wet-on-dry application.

For example, in some embodiments, the substrate is a coated article, e.g. a vehicle component that has been coated with a base coat, onto which the coating composition is applied. In such instances, the substrate may be further defined as a coated substrate. In such embodiments, the method may comprise one or more conditioning steps to prepare the substrate for application of the coating composition. For example, in specific embodiments, the substrate is dehydrated prior to application of the coating composition (i.e., where the substrate is further defined as a dehydrated substrate, such that the method utilizes a dehydrated substrate). In such embodiments, the application of the coating composition is performed as a wet-on-dry application. In certain embodiments, the selection of the coating composition will influence the Various substrates may include two or more discrete portions of different materials. For example, vehicles can include metal-containing body portions and plastic-containing trim portions. Due to the bake temperature limitations of plastics (80° C.) relative to metals (140° C.), the metal-containing body portions and the plastic-containing trim portions may be conventionally coated in separate facilities thereby increasing the likelihood for mismatched coated parts. A coating composition suitable for plastic substrates may be applied to the plastic substrates by the high transfer efficiency applicator after application and bake of the coating composition suitable for metal substrates without the need for masking the substrate and wasting a portion of the coating composition through low-transfer efficiency application methods, such as conventional spray atomization. The coating composition suitable for plastic substrates may be applied using a first high transfer efficiency applicator and the coating composition suitable for metal substrates may be applied using a second high transfer efficiency applicator. The first high transfer efficiency applicator and the second high transfer efficiency applicator may form a high transfer efficiency applicator assembly.

The high transfer efficiency applicator may be used in-line with another conventional coating techniques. For example, in certain embodiments, one or more coatings are applied to the substrate via a conventional coating method (e.g. spraying), and then the coating composition is next applied via the high transfer efficiency applicator. In this fashion, the coating prepared with the coating composition may be defined as an overspray free coating, as compared to the conventional application methods used for the other one or more coatings applied to the substrate.

The method includes a step of applying the coating composition to the substrate through the high transfer efficiency applicator, e.g. via the nozzles, to form the coating layer on the substrate. The step of applying is not particularly limited. In various embodiments, the step of applying is further defined as jetting, e.g. jetting through the high transfer efficiency applicator. Alternatively, the step of applying may be further defined as printing. In certain embodiments, the step of applying may be defined as digital printing.

In typical embodiments, the coating composition is ejected from one or more nozzles of the high transfer efficiency applicator in an engineered/controlled fashion that creates a fine stream, that may or may not breakup into droplets. This stream is targeted to the substrate such that drops arrive at specific locations to potentially form a continuous film or pattern on the subject. As a result, in many embodiments, there is essentially no overspray (drops missing their target) and nearly 100% transfer efficiency (all paint goes to targeted location on the substrate.) As will be appreciated by one of skill in the art, some allowance is made for start-up and stopping the high transfer efficiency applicator. Devices of this type can be described as drop-on-demand, stream-on demand, overspray-free, or ultra-high transfer efficiency applicators. These devices are different from spray atomization devices and techniques wherein energy, such as pneumatic, hydraulic, or centrifugal, energy, is introduced to create a partially controlled, random distribution of droplet sizes, trajectories and speeds, and wherein some additional mechanism, e.g. electrostatics and or shaping air, then guides a paint droplet cloud to a substrate. Relative to traditional paint spray, there is always some overspray and transfer efficiency loss.

As introduced above, the step of applying may be further defined as jetting or printing through, with, or by, the high transfer efficiency applicator. In certain embodiments, the step of applying produces droplets or a stream of the coating composition that impact(s) the substrate. In various embodiments, at least about 99.5, 99.6, 99.7, 99.8, 99.9, or even higher, % of the coating composition expelled from the high transfer efficiency applicator contact the substrate. Without being bound by theory, it is believed that an increase in the number of droplets contacting the substrate relative to the number of droplets that do not contact the substrate thereby entering the environment, improves efficiency of application of the coating composition, reduces waste generation, and reduces maintenance.

In various embodiments, at least about 99.5, 99.6, 99.7, 99.8, 99.9, or even higher, % of the droplets of the coating composition expelled from the high transfer efficiency applicator are monodispersed such that the droplets have a particle size distribution of less than about 20%, alternatively less than about 15%, alternatively less than about 10%, alternatively less than about 5%, alternatively less than 3%, alternatively less than 2%, alternatively less than 1%, or alternatively less than about 0.1%. While conventional applicators rely on atomization to form "a mist" of atomized droplets of a coating composition having a dispersed particle size distribution, the monodispersed droplets and/or streams formed by the high transfer efficiency applicator can be directed to the substrate thereby resulting in an improved transfer efficiency relative to conventional applicators.

During the step of applying the coating composition, a loss of volatiles after application through the high transfer efficiency applicator is typically less than about 1, alternatively less than about 0.5 weight percent actives based on a total weight of the coating composition, as attributed to the applicator itself. For example, not counting any effect of the emitter and/or irradiation, this amount can be less than about 0.4, 0.3, 0.2, or 0.1, weight percent actives based on a total weight of the coating composition. Typically, the terminology "volatiles" is defined as substances which will evaporate under the print conditions and thereby result in a weight loss of the coating composition itself. Loss of volatiles after application would be determined by the increase in % solids after over before application where % solids in each case would be determined gravimetrically by ASTM D2369-10. Such solids increase, especially regarding the solids on work application, are described in further detail herein.

Due to the lack of atomization during application of the coating composition, drying components may be utilized with the applicator, e.g. as part of a single system or as independent components. Examples of suitable drying components include heaters, forced air driers, UV lamps, etc., with others well known and readily envisioned by those of skill in the art. It will be appreciated, however, that such drying components are separate from (i.e., used in addition to) the emitter of the present embodiments, which may comprise similar is used for selectively irradiating the composition for viscosity build as described herein.

The method includes a step of irradiating the coating composition via the infrared emitter. The irradiation is not particularly limited, and generally may be selectively performed during and/or after application of the coating composition onto the substrate as detailed herein.

As will be understood by those of skill in the art, parameters of the irradiation, such as the frequency, intensity, and duration of exposure, may be varied. The particular parameters utilized will thus be selected in view of the particular components, steps, and desired outcome in the method as practiced, informed by the results of the exemplary embodiments set forth herein.

The duration of irradiation is not particularly limited, within the bounds of practicality for the process described. More specifically, a portion of the coating composition may be exposed to the radiation for but an instant (e.g. femtosecond-scale, etc.) or, alternatively, for seconds, minutes, or even hours depending on the component setup employed. The particular duration will be limited by the type and/or setup of the emitter utilized, and can be preset or adjusted in real-time (e.g. manually, in response to autonomous monitoring, or both).

In some embodiments, for example, the emitter comprises a carbon-infrared radiator, and the duration of irradiation (i.e., the duration for which a given portion of the coating composition is irradiated) is from about 1 second to about 1 hour, such as from 5s to 30 minutes, alternatively from about 10s to about 25 minutes, alternatively from about 15 s to about 25 minutes, alternatively from about 30s to about 20 minutes, alternatively from about 45s to about 20 minutes, alternatively from about 1 to about 20 minutes. In some such embodiments, the coating composition is irradiated multiple times (e.g. 2, 3, 4, 5, or more times), such that the values above may represent single exposure durations and the total durations of such embodiments are multiples thereof depending on the particular number of irradiation cycles employed.

It is to be appreciated that the durations listed above may be used for various other times of emitters as well, including those utilizing a LED (or OLED) lamp, a quartz envelope halogen (or other type of incandescent) lamp, etc.

The irradiation may be continuous or discontinuous relative to the coating composition being applied to the substrate. That is, the emitter may be operated in concert with the print head of the applicator, but need not be synchronized therewith. In this fashion, the emitter may be active/deactivated selectively, e.g. for use on vertical printed regions and not on horizontal printed regions. Additionally, the emitter may be operated to irradiate lower edges of vertical surfaces more than upper edges or middle portions. As such, it will be appreciated that the method provides for an efficient single-composition coating solution for highly-contoured parts, which includes selectively irradiating the coating composition to minimize sag while allowing for adequate flow and leveling to give good or great appearance characteristics.

As introduced above, certain additives (e.g. cosolvents) may be incorporated into the coating composition to facilitate selective tailoring of the rheology profile of the composition during and after application to the substrate. Such additives may be specifically selected (e.g. based on solvent compatibility, boiling point, IR absorption, etc.) in view of the emitter being used with the applicator, as well as the composition itself (e.g. in terms of rheology, application and performance characteristics, etc.). For example, viscosity reducing cosolvents may be added to the coating composition, e.g. to achieve a desired rheology profile, and therefor allow for improved flow and leveling on application. In such instances, the cosolvent can be quickly removed during the irradiation, thus also allowing for quick viscosity build of the composition through increase of solids on work application, while at the same time achieving selective control to prevent sag, excess running, etc.

As introduced above, the selective irradiation may be localized to certain portions of the coating being formed, e.g. to edges of a print area, to portions of the substrate with vertical or slanted contour, etc. Accordingly, in some embodiments the method comprises selectively tailoring a viscosity and/or solids content of the coating composition during and/or after application to the substrate. Owing to the nature of the high transfer efficiency applicator process used, such tailoring typically involves a localized (or global, if performed simultaneous to or in-line with the application) increase in solids content, as well as corresponding rheological changes such as increased viscosity. For example, the duration and/or peak wavelength of the infrared radiation may be selectively controlled to increase a localized temperature of the coating composition to above the boiling point of a solvent present in the coating composition, thereby allowing for the infrared radiation to increase viscosity build from solvent evaporation. In specific instances, controlling the infrared radiation comprises tailoring the radiation to the solvent, e.g. by selecting a band of wavelengths (i.e., broad or narrow band) to influence the solvent or carrier within minimal impact on the other components involved, by using pulsed and/or continuous irradiation, by selecting specific exposure times, etc., or combinations thereof. Moreover, as temperature increase typically corresponds to an associated viscosity reduction in the film-forming components of the composition, the irradiation may be used to affect a rapid solids increase and thereby reduce the net viscosity loss that would otherwise result from increased temperature, e.g. during drying of the coating being prepared. In specific embodiments, a continuous infrared exposure may be coupled with a pulsed irradiation, e.g. where the pulse(s) are utilized to increase the solids build at areas more prone to sag or run.

It is to be understood that irradiating the coating composition is carried out for rheological purposes, that is, to influence the viscosity of the coating composition and achieve improved coating performance and/or appearance characteristics. As such, in typical embodiments, the coating composition is not cured, reacted, dried, or otherwise substantially modified by the infrared exposure. While IR-mediated curable components may be utilized in conjunction with the present embodiments, it is to be understood that they are separate from (e.g. additional to) the present embodiments. As such, in typical embodiments, the coating composition is substantially free from infrared radiation-curable components, infrared radiation-activatable components, etc. In these or other embodiments, irradiating the coating composition does not substantially dry or cure the composition.

It will be appreciated from the forgoing that the coating composition is not typically chemically altered during the irradiating, save for potential solvent loss resulting from the infrared radiation and/or corresponding heat. However, as portions of the coating composition exposed to the infrared light will be distinguishable from non-irradiated portions, the irradiation can be understood to prepare an irradiated coating composition. So described, the irradiated coating composition is simply any of the coating composition having been irradiated. As such, it is possible and often desired to have different portions of the as-applied coating composition be irradiated or not, e.g. to selectively control the application results and thereby influence the appearance of the coating layer being prepared therewith.

In general, the irradiated coating composition is different from the coating composition in terms of solids content and/or viscosity. As such, the method may comprise selectively increasing the solids content and/or increasing the viscosity of the irradiated coating composition, as compared to the coating composition prior to exposure to the infrared radiation.

For example, the coating composition, as provided to the applicator, typically has a solids content of from about 5 to about 90, alternatively from 5 to about 80, or alternatively about 5 to about 70, wt. %. The solids content may be determined in accordance with ASTM D2369-10. In specific embodiments, the coating composition is further defined as the water borne coating composition and, as provided to the applicator, has a solids content of from about 8 to about 35 wt. %, alternatively from about 10 to about 30 wt. %. In other embodiments, the coating composition is further defined as the solvent borne coating composition and, as provided to the applicator, has a solids content of from about 30 to about 60 wt. %, alternatively from about 35 to about 50 wt. %.

In general, the irradiated coating composition that exhibits a solids content greater than the initial solids content. For example, the irradiated coating may have a solids content of at least 2, alternatively at least 3, alternatively at least 5, alternatively at least 7, alternatively at least 10% greater than the initial solids content. In these or other embodiments, irradiating the coating composition comprises increasing the solids content on work application by at least 2%, alternatively at least 3%, such as by at least 5-7% or more, relative the starting solids content prior to being applied, alternatively after application and prior to the irradiating.

For example, as described above, in some embodiments the coating composition is a solvent borne composition in a particular subrange of that above, such as an initial solids content of from about 25% to about 60%, for example from about 27% to about 55%, alternatively from about 30% to about 50%. In such embodiments, the irradiated coating composition typically has a solids content of at least 5%, alternatively at least 7% greater than the initial solids content of the coating composition.

In other embodiments, the coating composition is a water borne composition having an initial solids content of from about 5% to about 45%, such as from about 8% to about 35%, alternatively from about 10 to about 30 wt. %. In such embodiments, the irradiated coating composition typically has a solids content of at least 1%, alternatively at least 2%, alternatively at least 3%, alternatively at least 5% greater than the initial solids content of the coating composition. In some embodiments, the water borne coating composition is applied to the dehydrated substrate as described above, in which case the total difference in solids content from the as-applied coating composition to the irradiated coating composition may be apportioned between solvent migration (i.e., via interaction with the dehydrated substrate) and the irradiation step, such that the total increase in solids through application is greater than the solids build attributable to the irradiation alone.

The coating composition, as provided to the applicator, typically has an initial shear viscosity of from about 10 to about 100 cP at a shear rate of 1000/s. For example, in some embodiments, the coating composition exhibits an initial shear viscosity of less than about 60, alternatively less than about 25 cP at a shear rate of 1000/s. In specific embodiments, the coating composition is solvent borne and has an initial shear viscosity of from about 15 to about 60, alternatively from about 15 to about 35 cP. In other embodiments, the coating composition is water borne and has an initial shear viscosity of from about 10 to about 90 cP. In such embodiments, the water borne coating composition may be a relatively low viscosity composition with an initial shear viscosity of from about 10 to about 40 cP, or alternatively a relatively high viscosity composition with an initial shear viscosity of from about 40 to about 90 cP.

The particular selection of the coating composition is to be made in view of the method as a whole, e.g. where use of lower viscosity coating compositions may be facilitated by selection of a conditioned substrate. Specifically, the present method provides for use of a relatively lower viscosity coating composition when applied to a dehydrated substrate, e.g. in a wet-on-dry application process. However, the method may comprise a wet-on-wet application, which will also benefit from the features of the present embodiments. For example, the substrate may comprise a waterborne basecoat, onto which the coating composition may be applied via the method to prepare a waterborne top coat, clearcoat, etc., or a monocoat. The present embodiments provide for overspray-free/digital application of such coating layers, with controlled application via the selective tailoring and application parameters. As such, it will be appreciated that the type of coating being applied, the nature of the substrate being coated, and the desired end use of the coating being prepared, will each influence the particular selection of the method parameters. Specific selections are illustrated in the examples below, which can be used by those of skill in the art to inform the selections of other combinations of solvents, coating compositions, etc., within the scope of the embodiments herein.

In general embodiments, irradiating the coating composition comprises increasing the viscosity thereof, at least local to the irradiated coating composition thus prepared, by at least about 1%, alternatively at least about 5%, such as by at least about 10, 15, 20, 25% or more, relative the initial shear viscosity prior to being applied, alternatively after application and prior to the irradiating. For example, in some embodiments, the irradiated coating composition exhibits a shear viscosity of at least about 200 cP at a shear rate of 0.1/s In various embodiments, the method further includes a step of curing the coating composition on the substrate, thereby preparing a coated article. The curing conditions may vary, and will be selected by those of skill in the art based on the particular coating composition utilized.

Several exemplary embodiments are provided with illustrations shown in the Drawings. In particular, a high transfer efficiency applicator system comprising the applicator and the emitter is shown in FIGS. 1-4.

Figure 1B:
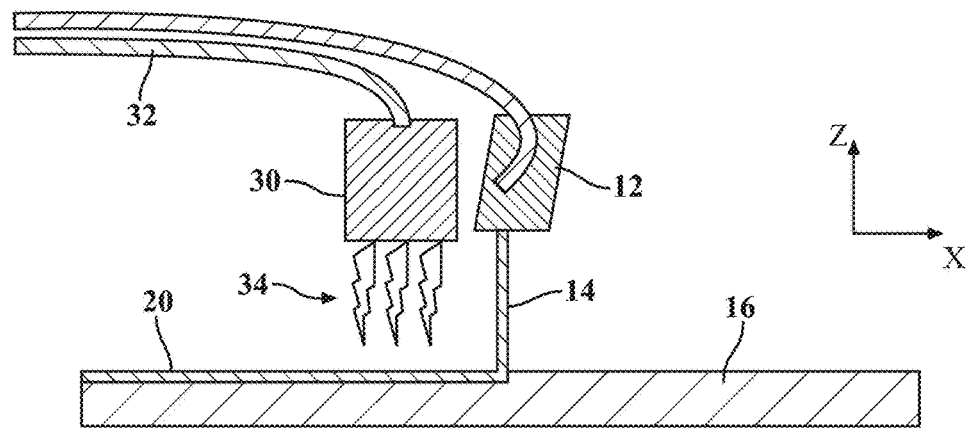
FIG. 1B is a side view of an embodiment of the high transfer efficiency applicator of FIG. 1A, with an emitter configured to irradiate the coating composition after application to the substrate.
Figure 1C:
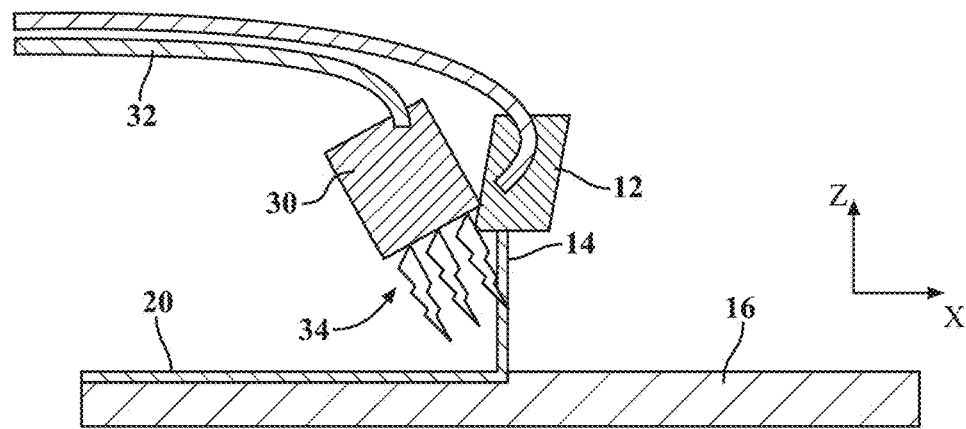
FIG. 1C is a side view of an alternative embodiment of the high transfer efficiency applicator of FIG. 1B, with the emitter configured to irradiate the coating composition during application to the substrate.

Turning to FIG. 1A-1C, a high transfer efficiency applicator 12 jets the coating composition 14 onto the substrate 16. More specifically, the applicator 12 makes adjacent passes to lay down stipes 20 of the coating composition 14. In FIG. 1A, each stripe 20 represents a single pass of ~50 nozzles on the print head of the applicator 12.

In FIG. 1A, a space 18 is indicated between a new stripe being printed and an already-applied stripe 20 on the substrate 16. This space 18 is preferably minimized or eliminated. However, those of skill in the art appreciate that overlapping the stripes 20 with conventional coating compositions can unintentionally lead to overlap defects via undesirable buildup of the composition and the formation of a type of "hill" or raised section of the substrate, as well as "valley" or low section of the substrate. This is also preferably minimized in the present embodiments, owing to the rheological profile of the coating composition allowing for reduced overlap defects. More particularly, the employment of the emitter 30, shown in FIG. 1A-1C as coupled to the applicator 12, allows for use the coating composition in a more flowable state, via allowing the flow and leveling composition once applied (e.g. as stripe 20) before being irradiated to build viscosity and prevent sag when needed. In this fashion, the emitter 30 is used to assist the applicator 12 by controlling the viscosity of the composition 14. This arrangement allows for selective solvent evaporation to inhibit sag, which also allowing for sufficient solvent to be present to achieve good flow and leveling, and provide good to great gloss and DOI.

With regard to FIG. 1B, an embodiment is shown where the emitter 30 is powered by supply 32 and irradiates the coating composition 14 during application. More specifically, the emitter 30 provides IR radiation 34 to a portion of the coating composition 14 composing stripe 20, i.e., already on the substrate 16. In another embodiment, shown in FIG. 1C, the emitter 30 is configured to irradiate the composition 14 before and/or during the application to the substrate 16.

In the embodiments illustrated in FIG. 1A-1C, the emitter 30 and the print head of the applicator 12 are fixed together. As such, the substrate 16 may be moved relative to a fixed position of the applicator 12, or the applicator 12 may be moved relative to a fixed position of the substrate 16, or both.

Figure 2:
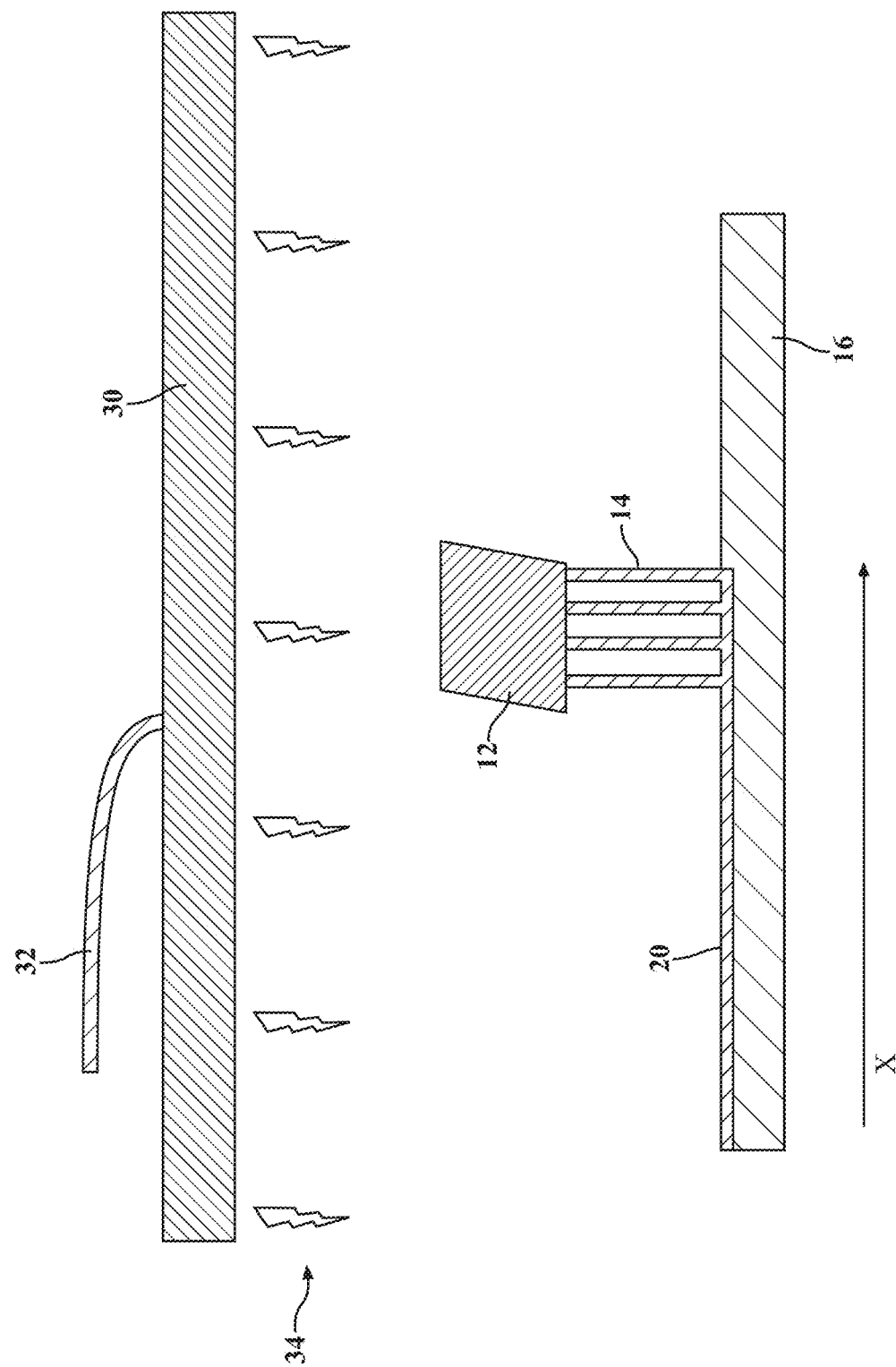
FIG. 2 is a side view of an alternative embodiment of the high transfer efficiency applicator including a plurality of nozzles applying a coating composition to a substrate, where an emitter is decoupled from the print head and irradiating a large print area.

Another arrangement is provided in FIG. 2, where the emitter 30 is not attached to the applicator 12. In this configuration, the emitter 30 can be used to provide IR radiation 34 continuously over a broad-area of the substrate 16. The emitter 30 may be moved independent of the substrate 16, or instead be fixed in relative position thereto. Similarly, the substrate 16 and the emitter 30 may be mobile compared to a fixed-position print head of applicator 12.

Also illustrated in FIG. 2 is single nozzle lines being applied from the applicator 12.

Typically, nozzle lines give a striated appearance in the coating as applied, with a distance between visible lines having the same spacing as the nozzles on the applicator 12. As such, application lines may be visible immediately after application, but are preferably less visible over time as flow and leveling occur. However, if sufficient flow and leveling does not occur, after coating cure the lines may still be visible and thereby give non-uniform and generally undesirable coating appearance. In specific embodiments, the overspray free coating layer is substantially free from visible application lines.

The stripe overlap defect may also present parallel to the direction of application (e.g. X), however, the defect is not associated with applicator nozzle spacing and is only present where application of adjacent stripes 20 applied sequentially next to each other overlap and are visible over a length scale of 5-10 mm, i.e., perpendicular to the application direction. In some embodiments, the overspray free coating layer is substantially free from visible stripe overlap defects.

Figure 3A:
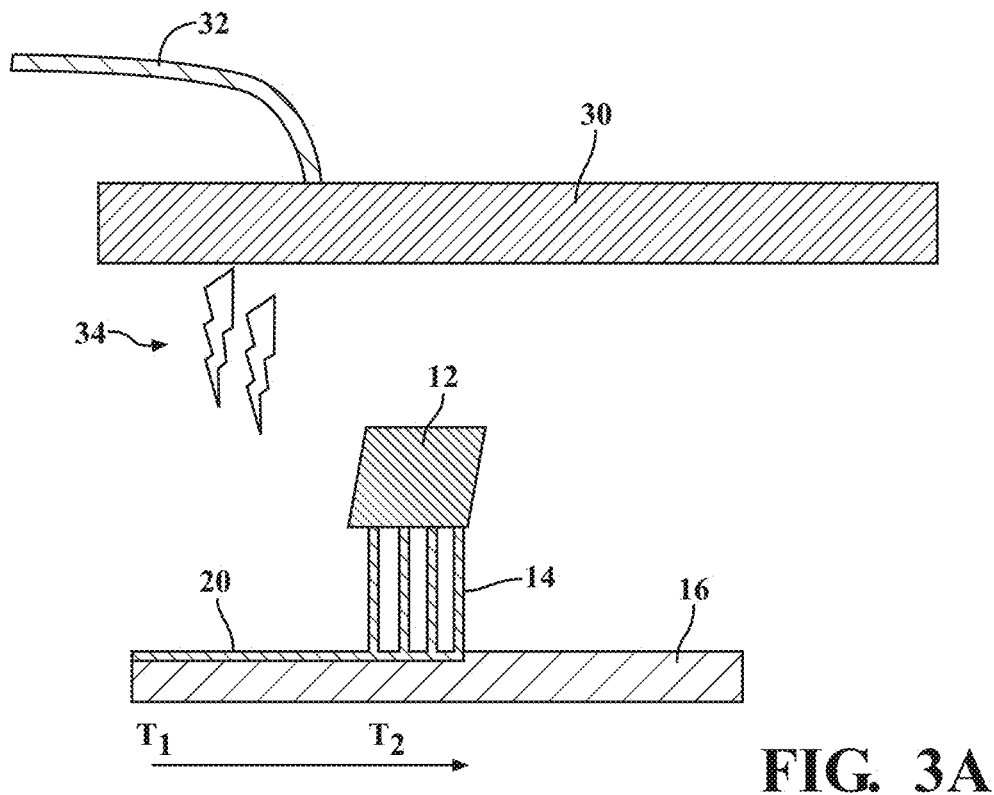
FIG. 3A is a side view of an embodiment of the high transfer efficiency applicator of FIG. 2, showing an emitter irradiating the coating composition at a time after printing.
Figure 3B:
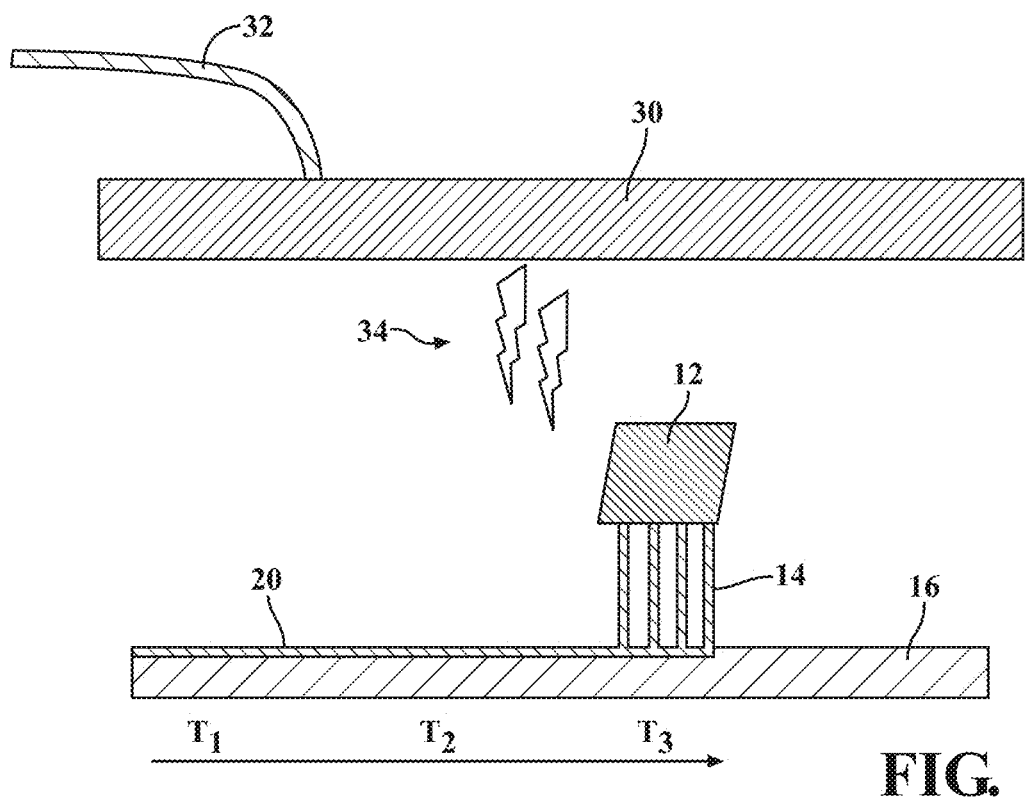
FIG. 3B is another side view of the high transfer efficiency applicator of FIG. 3A, showing the emitter irradiating the coating composition at another time after the printing in FIG. 3A.

FIG. 3A-3B provide another example of the emitter 30 being decoupled from the applicator 12, with the emitter 30 irradiating a portion of the stripe 20 once applied. In such embodiments, the irradiation by the emitter 30 is decoupled from the applicator 12, but configured to irradiate the stripe 20 for a time after application, represented by time points T1-T3 along the direction of application.

The method is typically carried out as part of a coating process, e.g. to prepare a coated article comprising the overspray-free coating layer on the substrate.

In various embodiments, the coating composition is further defined as an automotive OEM coating composition, an automotive refinish coating composition, an industrial coating composition, an architectural coating composition, a coil coating composition, or an aerospace coating composition, among others.

In some embodiments, the method is carried out in-line with other coating processes, such as those used in preparing a substrate for coating (e.g. conditioning, stripping, priming, etc.) and/or for finishing a coated substrate (e.g. top coating, clear coating, surface finishing, etc. In some embodiments, the coating composition is a base coat, and the method further comprises steps before and/or after applying the basecoat, such as priming, clear coating, etc. In other embodiments, the composition is a monocoat and the method further comprises steps before and/or after applying the monocoat, such as priming. In other embodiments, the

EXAMPLES

The following examples, illustrating embodiments of this disclosure, are intended to illustrate and not to limit the invention.

All parts and percentages are reported on a weight basis unless otherwise indicated. If provided, molecular weights (both number and weight average molecular weight) referred to herein may be determined by conventional methods known in the art. For example, molecular weights for polyaspartate resins can be determined via gel permeation chromatography (GPC), e.g. using polystyrene standards and a tetrahydrofuran (THF) eluent. Unless otherwise indicated, molecular weights are reports as weight average molecular weight (Mw).

Materials:

Unless otherwise noted, all solvents, substrates, and reagents are purchased or otherwise obtained from various commercial suppliers (e.g. BASF, Covestro, Evonik, Sigma-Aldrich, VWR, Alfa Aesar, etc.) and utilized as received (i.e., without further purification) or as in a form used conventionally in the art.

Various coating compositions were prepared using the specific materials below:

| Component | Description |
| --- | --- |
| Melamine 1 | Melamine Cymel 303 |
| Melamine 2 | Melamine Cymel 325 |
| Melamine 3 | Highly methylated, n-butylated melamine crosslinker with a high degree of alkylation |
| Melamine 4 | Methylated, isobutylated, melamine formaldehyde resin with high degree of alkylation (hexaether) |
| Melamine 5 | Highly monomeric, methylated/iso-butylated melamine crosslinker with a high degree of alkylation |
| Polyol 1 | Polyol, PPG-425 |
| Polyurethane Dispersion 1 | Polyurethane dispersion resin formed from a linear polyester diol resin (reaction product of monomers 1,6-hexanediol, adipic acid, and isophthalic acid) and isophorone diisocyanate. About 35 wt. % solid |
| Polyurethane Dispersion 2 | Polyurethane dispersion resin formed from a slightly branched polyester polyol (equivalent weight ~485, hydroxyl content 3.5%) and hexamethylene diisocyanate, about 40 wt. % solid |
| Polyurethane Dispersion 3 | Polyurethane dispersion resin formed from a linear polycarbonate-polyester polyol (equivalent weight ~1000, hydroxyl content 1.7%) and isophorone diisocyanate. About 41 wt. % solid |
| Polyurethane Dispersion 4 | Polyester based polyurethane dispersion, 30-32 wt. % solid |
| Acrylic Resin 1 | High solids acrylic resin: 71% solids, 11% styrene, 21% BMA, 12% BA, 27% HPA |
| Acrylic Resin 2 | Si dispersion with acrylic resin dispersant |
| Acrylic Resin 3 | 45% solids acrylic resin dispersion, non-aqueous |
| Enamel Resin 1 | High-solids enamel resin, 60/40 BMA/HPA, 7000 Mw, in Aromatic Hydrocarbons (below) |
| Glycol Ether Polyester 1 | Glycol ether polyester, 80 wt. % solid, acid number ~7 |
| Styrene-Acrylic Latex Dispersion 1 | Styrene-acrylic latex dispersion is formed by a two-step emulsion polymerization process, 46 wt. % solid, Tg ~-7 °C., acid number ~12, hydroxyl number ~7 |
| Polysiloxane Resin 1 | BYK 320, solution of 52% polyether modified methylalkyl polysiloxane/42.9% mineral spirit/5.1% propylene glycol monomethyl ether acetate |
| Hindered Amine 1 | Hindered amine light stabilizer (HALS), based on an amino-ether |
| Urethane Oligomer 1 | Low Tg Urethane Oligomer, 80% solids, 49% isocyanate, 7% cyclohexanol, 23% 2-ethyl hexanol |
| Silylated Oligomer Acrylosilane 1 | Silane acrylic polymer, 76% solids Dual-functional acrylosilane polymer, 8000 Mw, 70% solids |
| Acrylosilane 2 | Dual-functional acrylosilane polymer, 6500 Mw, 71% solids |
| Coating Additive 1 | Clearcoat additive based on 49° F. Tg acrylic resin, 60% solids |
| Coating Additive 2 | 10% solution DOWSIL 57 ADDITIVE in Aromatic Hydrocarbons (below) |
| Flow Additive 1 | Commercial flow additive |
| Flow Additive 2 | Acrylic copolymer flow additive, 50% solids in butyl acetate, 25% IBA, 25% IBMA |
| Black Pigment 1 | Dispersion of amorphous carbon black pigment, similar to a carbon black pigment, 28% solid |
| Black Pigment 2 | Dispersion of amorphous carbon black pigment, similar to a carbon black pigment, 17% solid |
| Black Pigment 3 | Dispersion of a black pigment |
| Catalyst 1 | DDBSA/AMP catalyst solution |
| Catalyst 2 | DDBSA/DIPA solution |
| Uv Additive 1 | UV absorber |
| Uv Additive 2 | UVA screener/HALS solution based on an amino-ether with benzotriazole |
| Levelling Additive 1 | Levelling additive |
| Wetting Agent 1 | Wetting agent, silicone free |
| Wetting Agent 2 | Wetting agent |
| Defoamer 1 | Defoamer |
| Rheology Additive 1 | HEUR thickener |
| Rheology Additive 2 | Acrylic alkali emulsion is commercially available from BASF Corporation of Florham Park, New Jersey under the tradename Rheovis ® AS 1130 |
| Rheology Additive 3 | Layered silicate rheology control agent is provided in a solution of water and polypropylene glycol which is similar to a solution commercially available from Altana under the trade name Laponite RD |
| Polyalcohols | Polyalcohols |
| N-Butyl Alcohol | N-butyl alcohol |
| Diethylene Glycol Monobutyl Ether | Diethylene glycol monobutyl ether |
| Ethylene Glycol Monobutylether | Ethylene glycol monobutylether |
| Water | Water |
| Mineral Spirit | Mineral spirit |
| High Boiling Point Alcohol | High boiling point alcohol |

-continued

| Component | Description |
|---|---|
| Amino Methyl Propanol | Amino methyl propanol |
| N,N-Dimethyl-ethanolamine | N,N-Dimethylethanolamine |
| Trimethyl Orthoacetate | Trimethyl orthoacetate |
| Ethyl 3-Ethoxy Propionate | Ethyl 3-ethoxy propionate |
| Aromatic Hydrocarbons | Aromatic hydrocarbons, boiling point 140-200° C., density 0.8750 g/L @ 20° C. |

A solvent-borne coating composition (SB1) was formulated and prepared using the components above. The particular components and parameters are shown in the table below.

| Component | Amount |
|---|---|
| Melamine 3 | 0.97 |
| Melamine 4 | 2.20 |
| Melamine 5 | 8.00 |
| N-Butyl Alcohol | 4.00 |
| Polysiloxane Resin 1 | 0.10 |
| Hindered Amine 1 | 0.29 |
| Flow Additive 2 | 0.28 |
| Catalyst 2 | 1.33 |
| Urethane Oligomer 1 | 8.42 |
| Trimethyl Orthoacetate | 2.19 |
| Acrylic Resin 1 | 2.01 |
| Coating Additive 1 | 15.77 |
| Uv Additive 2 | 5.28 |
| Acrylic Resin 2 | 1.94 |
| Black Pigment 3 | 10.19 |
| Ethyl 3-Ethoxy Propionate | 1.29 |
| Silylated Oligomer | 4.60 |
| Acrylosilane 1 | 26.40 |
| Acrylosilane 2 | 4.71 |
| Total: | 100.00 |

Three additional solvent-borne coating compositions (SB2, SB3, SB4) were prepared using the components further above. These compositions were formulated for overspray-free application according to the methods herein, and used in the Print Trials set forth below. The particular components and parameters of the solvent-borne compositions are shown in the table below.

| Coating Composition: | SB2 | SB3 | SB4 |
|---|---|---|---|
| Melamine 4 | 20.67 | 20.44 | 18.84 |
| Aromatic Hydrocarbon | 19.67 | 10.59 | 23.98 |
| Enamel Resin 1 | 51.45 | 34.95 | 43.81 |
| Acrylic Resin 3 | — | 19.53 | — |
| Coating Additive 2 | 0.06 | 0.06 | 0.05 |
| Catalyst 1 | 1.44 | 1.42 | 1.31 |
| Black Pigment 3 | 6.71 | 13.02 | 12.01 |
| Total: | 100.0 | 100.0 | 100.0 |

As formulated and prepared SB2 represents a single component solvent-borne mono-coat composition comprising a viscosity of 29.6 cP at 25° C. SB3 represents a single component solvent-borne base-coat composition comprising a viscosity of 42.5 cP at 25° C. SB4 represents a single component solvent-borne mono-coat composition comprising a viscosity of 64.9 cP at 25° C.

Figure 4:
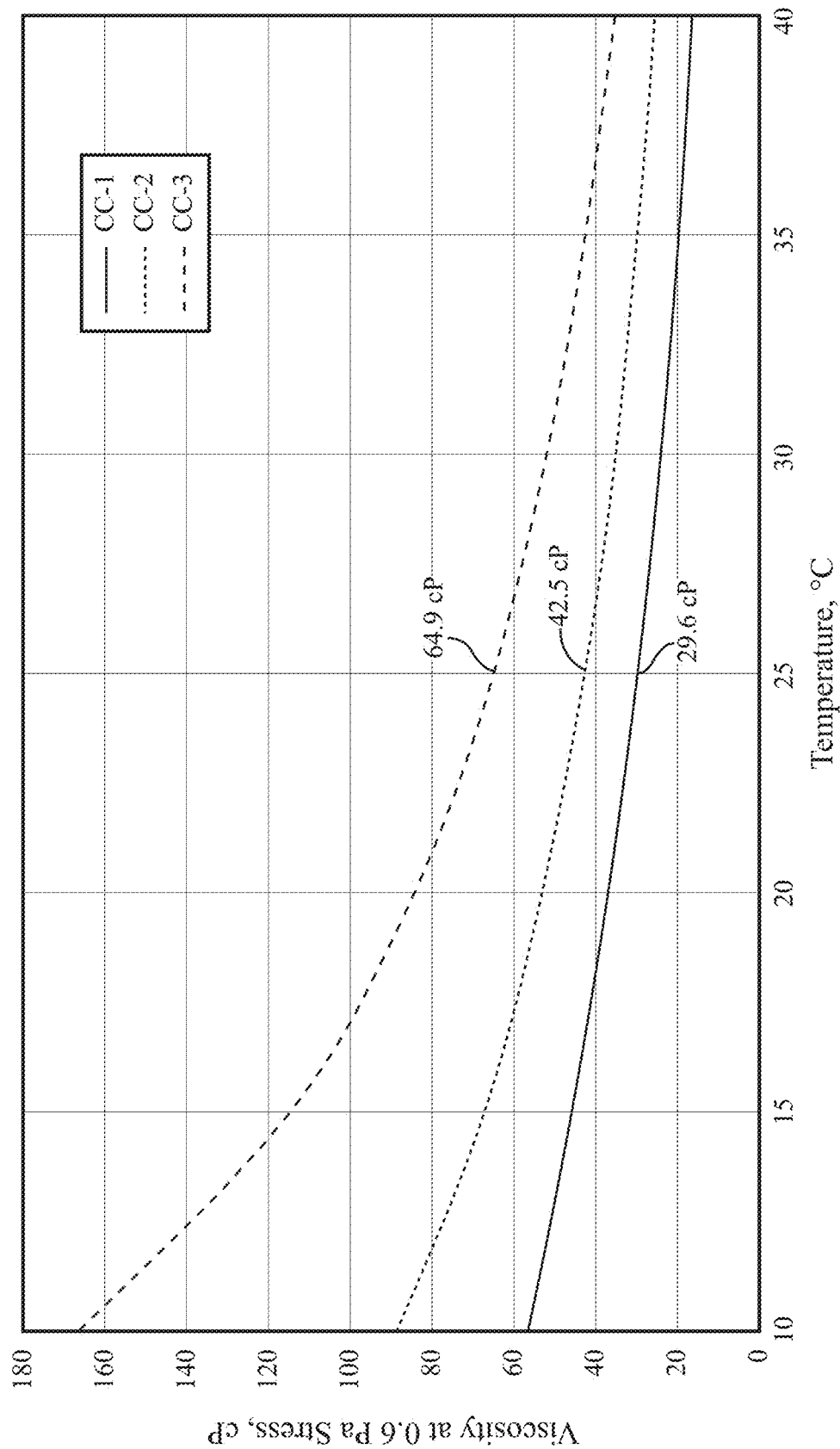
FIG. 4 is a plot showing the results of a controlled viscosity sweep, illustrating the rheology profile of coating compositions suitable for the present embodiments.

A comparative viscosity profile of coating compositions SB2, SB3, and SB4 is shown in FIG. 4.

Water-borne coating compositions (WB) were formulated and prepared using the components set forth further above to give WB1-7. The particular components and parameters are shown in the table below.

| Component | WB1 | WB2 | WB3 | WB4 | WB5 | WB6 | WB7 |
|---|---|---|---|---|---|---|---|
| Melamine 1 | 3.29 | 3.70 | 2.35 | 2.35 | 2.35 | 2.35 | 1.12 |
| Melamine 2 | 0.63 | 0.70 | — | — | — | — | — |
| Polyol 1 | 0.91 | 1.02 | 0.14 | 0.14 | 0.14 | 0.14 | 0.07 |
| Polyurethane Dispersion 1 | 3.49 | 3.94 | 3.81 | 3.81 | 3.81 | 3.81 | 1.80 |
| Polyurethane Dispersion 2 | 4.62 | 5.19 | — | — | — | — | — |
| Glycol Ether Polyester 1 | — | — | 1.16 | 1.16 | 1.16 | 1.16 | 0.55 |
| Styrene-Acrylic Latex Dispersion 1 | 8.11 | 9.15 | 8.15 | 8.15 | 8.15 | 8.15 | 3.88 |
| Polyurethane Dispersion 3 | 1.67 | 1.88 | — | — | — | — | — |
| Polyurethane Dispersion 4 | 1.71 | 1.89 | — | — | — | — | — |
| Flow Additive 1 | 0.46 | 0.51 | — | — | — | — | — |
| Polyalcohols | — | — | 2.00 | 2.00 | 2.00 | 2.00 | 2.00 |
| N-Butyl Alcohol | 6.30 | 6.30 | — | — | — | — | — |
| Diethylene Glycol Monobutyl Ether | 2.75 | 2.75 | — | — | — | — | — |
| Ethylene Glycol Monobutylether | 1.28 | 1.20 | — | — | — | — | — |
| Water | 43.15 | 47.54 | 61.02 | 63.99 | 58.96 | 61.88 | 73.62 |
| Mineral Spirit | 1.00 | 1.00 | — | — | — | — | — |
| High Boiling Point Alcohol | — | — | 5.00 | 5.00 | 5.00 | 5.00 | 5.00 |
| Black Pigment 1 | 16.04 | 8.74 | — | — | — | — | — |
| Black Pigment 2 | — | — | 7.55 | 7.55 | 7.55 | 7.55 | 5.06 |
| Catalyst 1 | — | — | 0.14 | 0.14 | 0.14 | 0.14 | 0.07 |
| UV Additive 1 | — | — | 0.03 | 0.03 | 0.03 | 0.03 | 0.01 |
| Levelling Additive 1 | — | — | 2.00 | 2.00 | 2.00 | 2.00 | 2.00 |
| Wetting Agent 1 | — | — | 1.20 | 1.20 | 1.20 | 1.20 | 1.20 |
| Amino Methyl Propanol | — | — | 0.30 | 0.32 | 0.01 | 0.01 | 0.02 |
| N,N-Dimethylethanolamine | 0.14 | 0.13 | — | — | — | — | — |

-continued

| Component | WB1 | WB2 | WB3 | WB4 | WB5 | WB6 | WB7 |
|---|---|---|---|---|---|---|---|
| Wetting Agent 2 | 0.50 | 0.50 | — | — | — | — | — |
| Defoamer 1 | 1.95 | 2.02 | — | — | — | — | — |
| Rheology Additive 1 | — | — | — | — | 4.50 | 4.58 | 3.60 |
| Rheology Additive 2 | 2.00 | 1.84 | 2.16 | 2.16 | — | — | — |
| Rheology Additive 3 | — | — | 3.00 | — | 3.00 | — | — |
| Total: | 100.0 | 100.0 | 100.0 | 100.0 | 100.0 | 100.0 | 100.0 |

Print Trial 1: Critical Film Thickness of SB2

SB2 was printed on a flat, horizontal plate using a high transfer efficiency applicator at a density of 1440 DPI to give a first sample coating, and at 720 DPI to give a second sample coating. The sample coatings were assessed visually to determine an estimated critical film thickness, i.e., a print density suitable for achieving a consistent/uniform visual coating appearance.

Figure 5A:
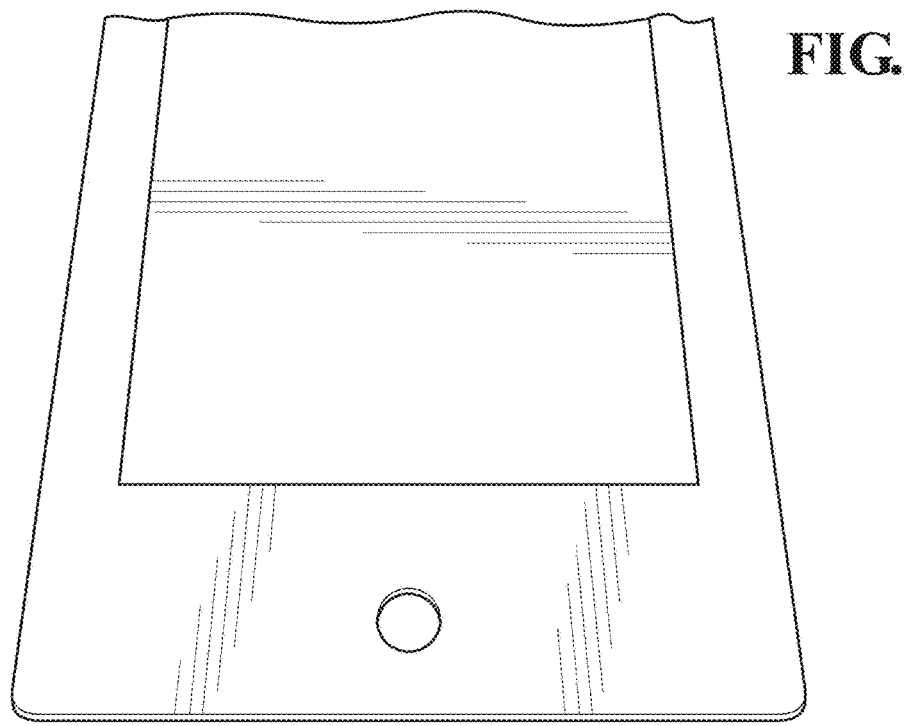
FIG. 5A is an illustration of a photograph taken of a sample coated article during an assessment of the appearance of coatings prepared in the Examples, for evaluating the critical film thickness of exemplary coating compositions prepared at different laydown densities.
Figure 5B:
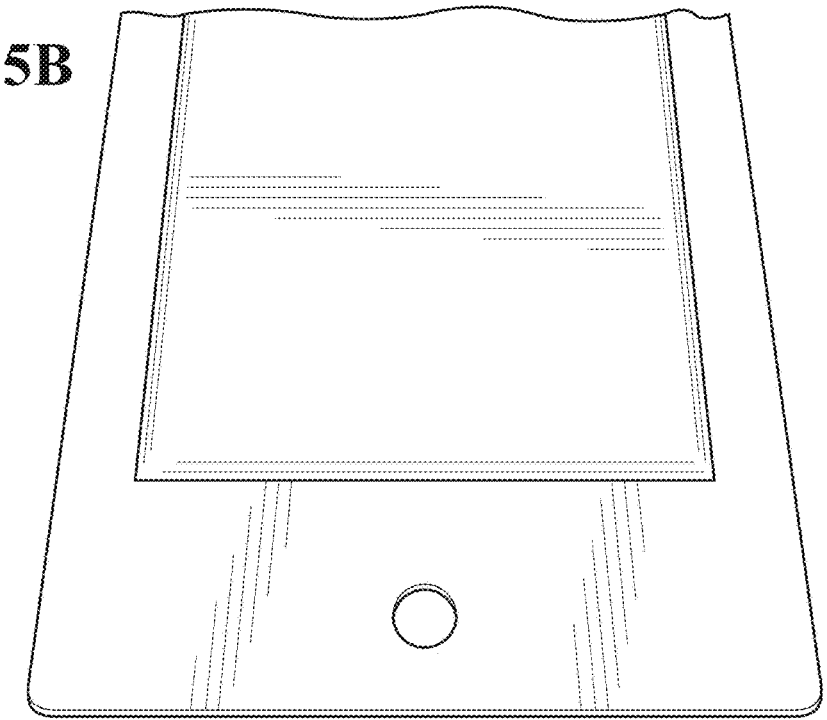
FIG. 5B is an illustration of a photograph of another sample coated article during the assessment of the appearance of coatings prepared in the Examples alongside that shown in FIG. 5A, prepared at a different laydown density.

As shown in FIG. 5A, the 1440 DPI sample coating exhibits a uniform appearance, whereas the 720 DPI sample (FIG. 5B) appears paler in the middle with a darker ring around the perimeter of the coated area. Accordingly, 1440 DPI is above the critical film thickness for SB2, while 720 DPI is below the critical film thickness for SB2.

Print Trial 2: SB4 1440 DPI

SB4 was printed using a high transfer efficiency applicator at a density of 1440 DPI to match the above-critical film thickness conditions determined for SB2.

Figure 6:
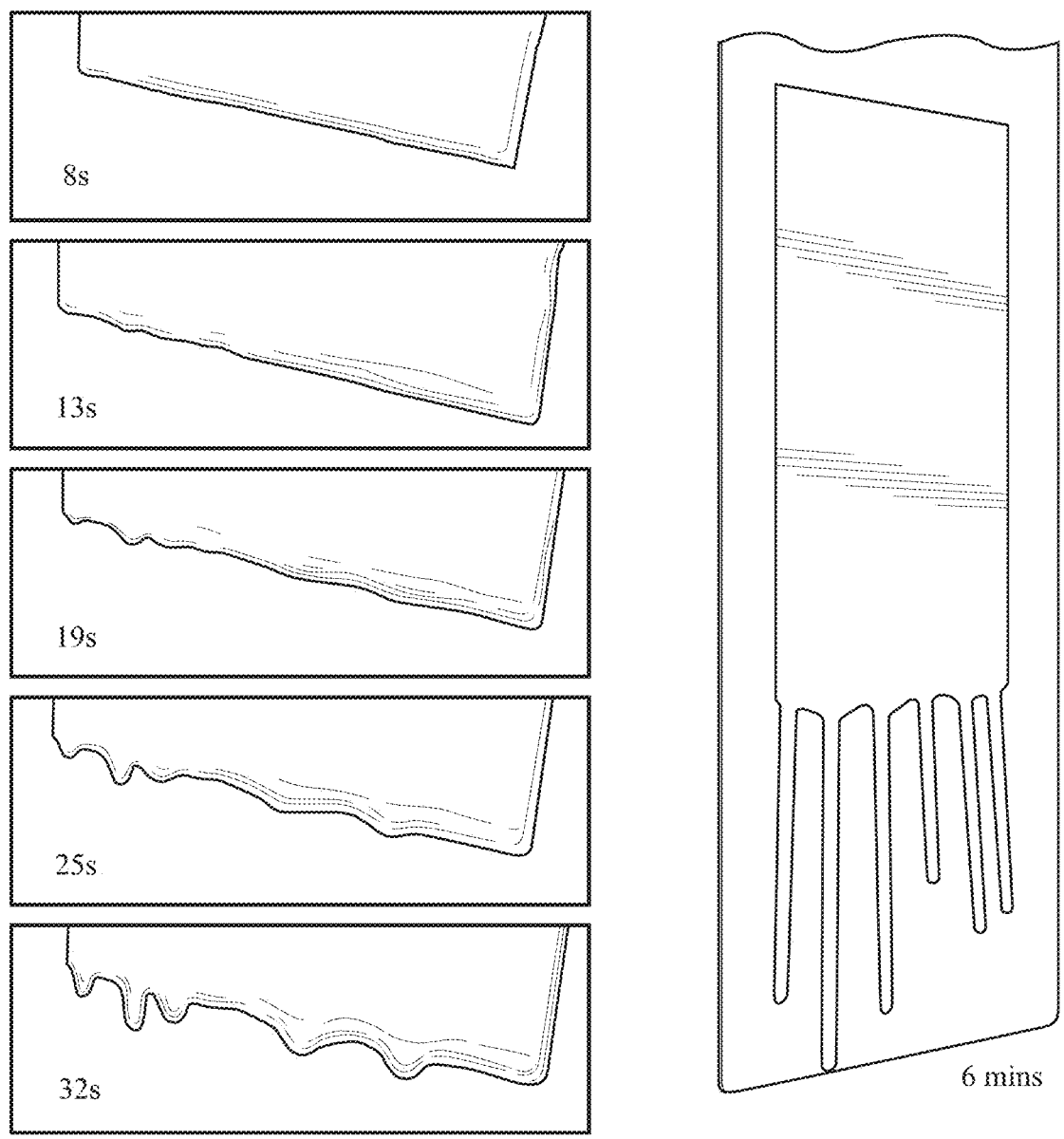
FIG. 6 is an illustration based on a series of photographs taken over time during an assessment of the sag performance of coatings prepared in the Examples during a vertical storage time post-application.

SB4 was printed (29 V, 27° C.) on a flat, horizontal plate, then stood vertically for air-drying time before being hung vertically in an oven (140° C.) to cure. Images of the coating layer are shown in FIG. 6 at various times during the vertical storage time.

As shown, the bottom edge of the coating area beaded in under 8 s, with full drips forming in ~20 s and reaching the end of the plate before drying (6 min). Upon inspection, it was observed that the start of print thinned to below the critical film thickness (~10 µm), while fluid accumulated at end of print and flowed past the edge of original print area.

Print Trial 3: SB4 720 DPI

SB4 was printed according to Print Trial 2 above, at a lower laydown density of 720 DPI to assess sag correlation with film thickness. A second plate was also printed and heated with a heat gun for 15 minutes. Images of the coating layers are shown in FIG. 8 at various times during the vertical storage time. A third plate (not shown) was also printed, stood vertically to dry, but laid flat for curing.

As shown, the 720 DPI density of SB4 performed much better in terms of visual sag than the higher laydown density trialed in Print Trial 2. It is also shown that the 720 DPI is above the critical film thickness for SB4. Additionally, it is shown that the added heat-gun drying step matches the 50 s timepoint after 15 minutes.

Upon inspection of the heat-gun-dried sample, it was observed that the start of print thinned but remained above the critical film thickness. While some fluid accumulated at end of the print, it did not progress past the edge of the print area.

The flat-cured sample demonstrated some accumulation at the ends, and a 1 µm difference in thickness from start-to-end, but appeared to stabilize quickly.

Print Trial 4: SB3 720 DPI

Figure 7:
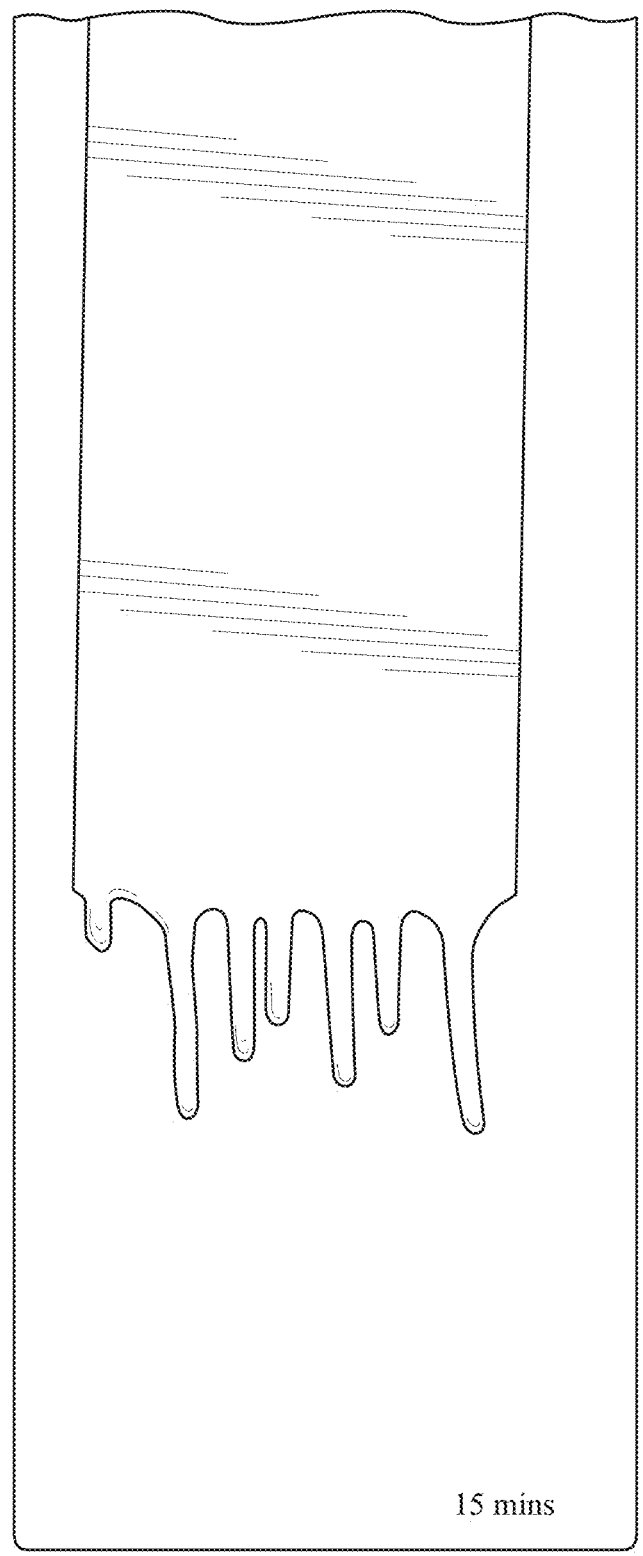
FIG. 7 is an illustration of a photograph of a coating composition prepared in a similar trial to those of FIG. 6, prepared at a different laydown density and taken at a later time.

SB3 was printed according to Print Trial 2 above. An image of the coating layer at 15 min is shown in FIG. 7. As shown, while ~22 cP lower in viscosity than SB4, SB3 exhibited significantly less sag, even at a laydown density of 1440 DPI. The coating layer was completely fixed and dried within 15 min, with only about ⅓ of the drip length demonstrated by SB4 after 6 min at the same 1440 DPI (Print Trial 2). Upon inspection, the coating from SB4 exhibited an orange peel-like surface texture.

Example 1 and Comparative Examples 1 & 2

Based on the results of the Print Trials, the coating compositions, SB5 (30 cP) and SB5 (60 cP), were selected for comparative printing trials. These coating compositions are representative of single-component solvent-borne monocoat compositions.

SB5 (30 cP) was utilized for Example 1 and Comparative Example 1. SB6 (60 cP) was utilized for Comparative Example 2 to assess sag correlation with viscosity at the same laydown density, and validate the anti-sag performance of the selective irradiation used in Example 1.

Each coating composition was printed on a flat, horizontal panel using a stationary printer with a NIR lamp mounted near the print head and a moving print base (table).

The print conditions were selected for a 1080 DPI print at 50 mm/s, to achieve a dry film build of ~0.6 mil. For Example 1, the components were configured to irradiate the coating composition once applied (printed), by exposing the panel to the NIR lamp 2× after printing. The coated panel was then stood vertical to dry and visually assessed.

For Comparative Examples 1 & 2, print conditions were as above, without the irradiation (the infrared exposure was omitted).

Figure 9A:
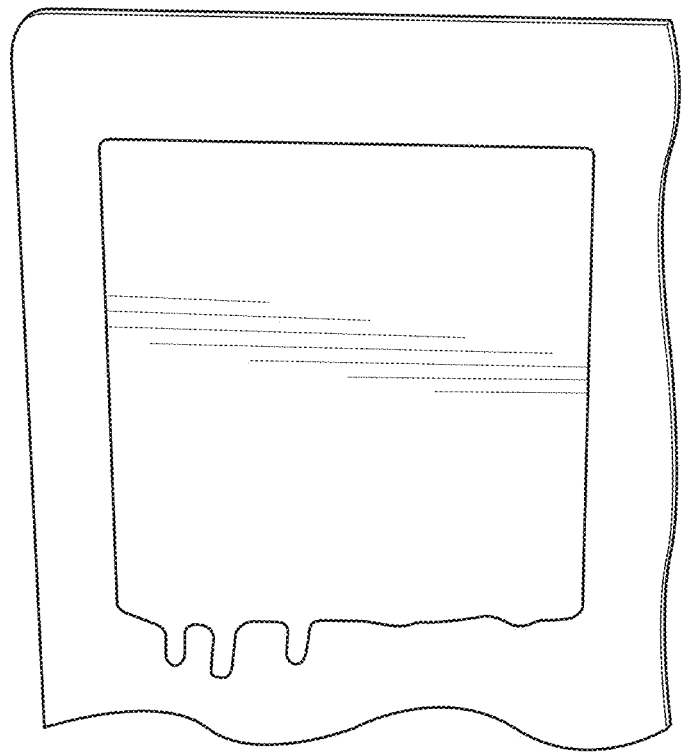
FIGS. 9A, 9B, and 9C are illustrations of a series of photographs taken for a sag and appearance analysis, with an exemplary coating prepared according to the present embodiments (FIG. 9A) analyzed against a set of comparative examples (FIGS. 9B, 9C) without irradiation (FIG. 9B) and without irradiation and at different laydown density (FIG. 9C).
Figure 9B:
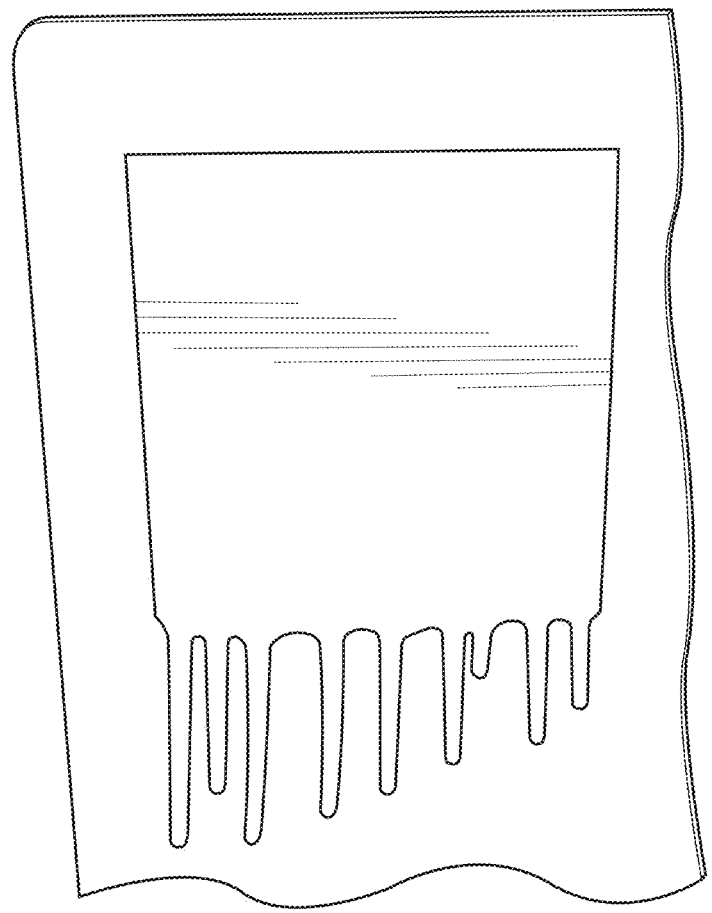
Figure 9C:
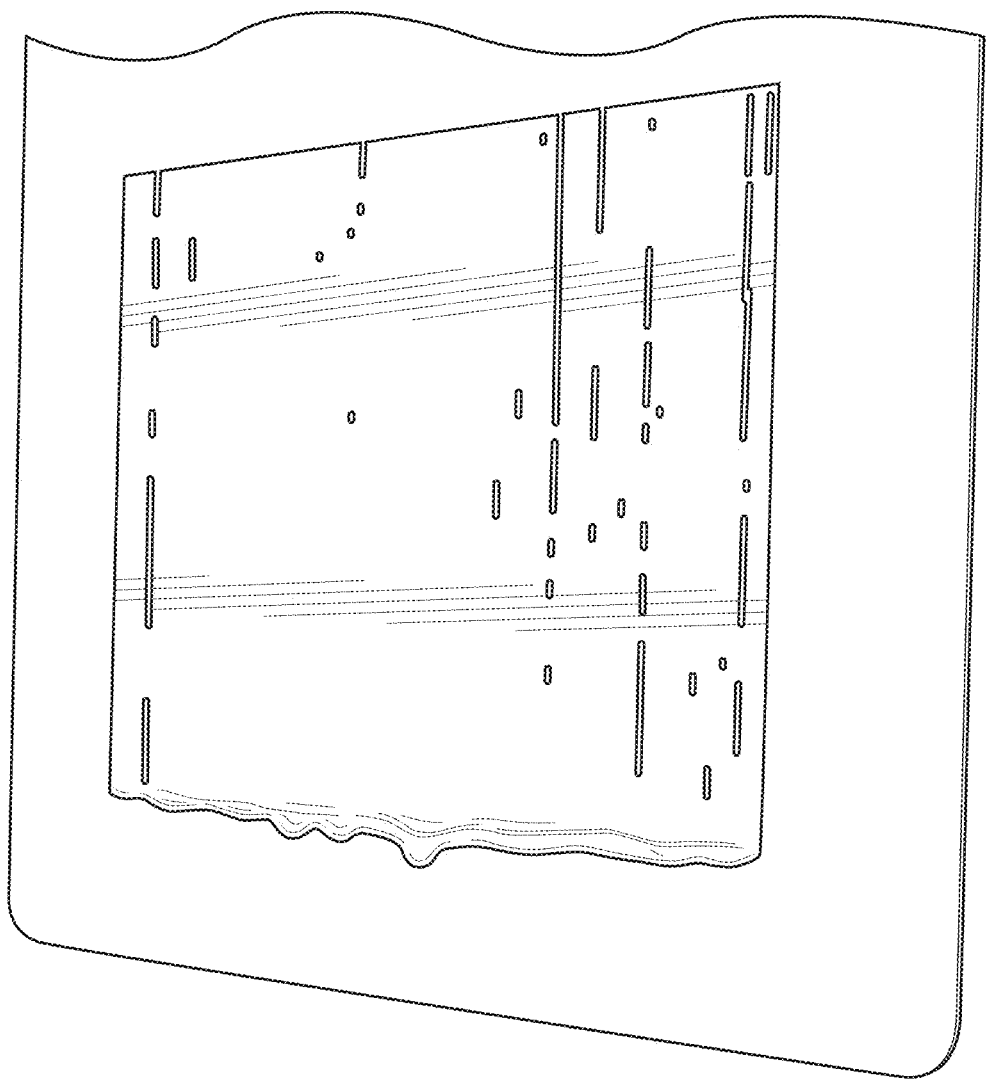

The results of Example 1 and Comparative Examples 1 & 2 are shown in FIG. 9A-9C.

As shown, the selective irradiation during application of SB5 in Example 1 (FIG. 9A) resulted in a substantial decrease in drippage/travel of the as-printed composition on the panel over that of non-irradiated Comparative Example 1 (FIG. 9B), while maintaining good appearance characteristics.

With regard to Comparative Example 2 (FIG. 9C), it is shown that increased viscosity does decrease sag. However, the increased viscosity composition demonstrated poor print quality with significant visual defects characteristic of poor flow and leveling.

Additional Examples

The coating compositions SB1 and WB1-7 are each assessed to determine initial viscosity and solids content. Each composition is then applied via the methods above, and the solids on work application measured after irradiation. An increase in solids content of at least 7% is observed for the solvent-borne composition SB1.

Accordingly, the present embodiments provide the method capable of achieving balanced printing performance (e.g. low sag, good flow and leveling) while maintaining good coating appearance characteristics. Specific implementations of the present embodiments may also provide superior performance and/or appearance over the comparative methods.

The data set forth shows that the exemplary compositions exhibit good performance and can be used prepare overspray free coatings in good order, with some exemplary coatings providing superior performance and appearance over the comparative coating compositions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It is to be understood that various changes may be made in the function and arrangement of elements described in an exemplary embodiments above, without departing from the scope as set forth in the appended claims. Moreover, all combinations of the aforementioned components, compositions, method steps, formulation steps, etc. are hereby expressly contemplated for use herein in various non-limiting embodiments even if such combinations are not expressly described in the same or similar paragraphs.

With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the ranges and subranges enumerated herein sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. An individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims. Lastly, it will be understood that the term "about" with regard to any of the particular numbers and ranges described herein is used to designate values within standard error, equivalent function, efficacy, final loading, etc., as understood by those of skill in the art with relevant conventional techniques and processes for formulation and/or utilizing compounds and compositions such as those described herein. As such, the term "about" may designate a value within 10, alternatively within 5, alternatively within 1, alternatively within 0.5, alternatively within 0.1, % of the enumerated value or range.

While the present disclosure has been described with respect to particular embodiments thereof, it is apparent that numerous other forms and modifications will be obvious to those skilled in the art. The appended claims and this disclosure generally should be construed to cover all such obvious forms and modifications, which are within the true scope of the present disclosure.

The invention claimed is:

1. A method of applying a coating composition to a substrate utilizing a high transfer efficiency applicator to form a coating layer disposed on the substrate, said method comprising:
   providing a high transfer efficiency applicator comprising a plurality of nozzles, each being configured to apply a stream or stream of droplets of the coating composition to a substrate substantially without atomization, and an infrared emitter;
   providing a coating composition for overspray-free application to the high transfer efficiency applicator, the coating composition exhibiting an initial shear viscosity of from about 10 to 100 cP at a shear rate of 1000/s and/or an initial solids content of from about 5 to about 70%, and comprising:
   a carrier,
   a binder present in an amount of from 5 to about 70 wt. % based on a total weight of the coating composition, and
   a crosslinker present in an amount of from about 0.1 to about 25 wt. % based on a total weight of the coating composition;
   applying the coating composition with the high transfer efficiency applicator via disposing a plurality of lines of the coating composition onto the substrate via the plurality of nozzles; and
   irradiating the coating composition via the infrared emitter during and/or after application to give an irradiated coating composition that exhibits a shear viscosity greater than the initial shear viscosity and/or a solids content greater than the initial solids content.

2. The method of claim 1, wherein applying the coating composition to the substrate comprises disposing partially-overlapping successive stripes of the irradiated coating composition onto the substrate to give a continuous wet film; wherein the method further comprises conditioning the wet film via at least partially flashing and/or dehydrating to give the overspray free coating layer; and wherein:
   (i) the wet film is substantially free from visible sag, optionally after a time of at least about 30 s;

(ii) the overspray free coating layer is substantially free of visual appearance defects due to incomplete flow and/or leveling from individual nozzle lines;

(iii) the overspray free coating layer is substantially free from visible stripe overlap defects; or (iv) any combination of (i)-(iii).

3. The method of claim 1, wherein:

(i) the coating composition exhibits an initial shear viscosity of less than about 60, alternatively less than about 25 cP at a shear rate of 1000/s;

(ii) the irradiated coating composition exhibits a shear viscosity of greater than about 200 cP at a shear rate of 0.1/s; or (iii) both (i) and (ii).

4. The method of claim 1, wherein:

(i) the coating composition is a solvent-borne composition having an initial solids content of from about 25% to about 60%, alternatively from about 27% to about 55%, alternatively from about 30% to about 50%, and wherein the irradiated coating composition has a solids content of at least 5%, alternatively at least 7% greater than the initial solids content of the coating composition; or (ii) the coating composition is a water-borne composition having an initial solids content of from about 5% to about 45%, alternatively from about 8% to about 35%, and wherein the irradiated coating composition has a solids content of at least 2%, alternatively at least 3%, alternatively at least 5% greater than the initial solids content of the coating composition.

5. The method of claim 1, wherein the infrared emitter is configured to:

(i) selectively irradiate the coating composition during application such that the irradiated coating composition is formed prior to being disposed onto the substrate;

(ii) selectively irradiate the coating composition after application such that the irradiated coating composition is formed after the coating composition is disposed onto the substrate or (iii) both (i) and (ii).

6. The method of claim 1, wherein each of the plurality of nozzles: (i) defines a nozzle orifice having a diameter of from about 0.00002 m to about 0.0004 m; (ii) is independently coupled to a print head; or (iii) both (i) and (ii).

7. The method of claim 6, wherein the infrared emitter is coupled to the print head and configured to be used in proximity thereto.

8. The method of claim 6, wherein the infrared emitter is not coupled to the print head and is configured to be used separately therefrom.

9. The method of claim 1, wherein the coating composition is applied with the high transfer efficiency applicator such that at least prior to irradiation the loss of volatiles from application through the high transfer efficiency applicator is less than about 1 wt. %, alternatively less than about 0.5 wt. %, based on a total weight of the coating composition.

10. The method of claim 1, wherein the coating composition is substantially free from: (i) infrared radiation-curable components; (ii) infrared radiation-activatable components; or (iii) both (i) and (ii).

11. The method of claim 1, wherein irradiating the coating composition comprises selectively controlling the duration and/or peak wavelength of the infrared radiation based on one or more solvents or carriers present in the coating composition.

12. The method of claim 11, wherein the duration and/or peak wavelength of the infrared radiation are selectively controlled to: (i) reduce viscosity loss from increased temperature; (ii) increase viscosity build from solvent or carrier evaporation; or (iii) both (i) and (ii), of the irradiated coating composition.

13. The method of claim 11, wherein the duration and/or peak wavelength of the infrared radiation are selectively controlled to increase the solids of the coating composition to give the irradiated coating composition with a solids on work application of at least about 5, alternatively at least about 7% greater than the initial solids of the coating composition.

14. The method of claim 11, wherein selectively controlling the duration and/or peak wavelength of the infrared radiation comprises providing a focused pulse of narrow-spectrum radiation in singular, regular, or period bursts, or combinations thereof.

15. The method of claim 1, wherein the solids content of the coating composition is chosen, and each of at least the carrier, binder, and cross-linker is independently present in an amount, such that the coating composition exhibits:

(i) an Ohnesorge number (Oh) of from about 0.01 to about 12.6 as determined in accordance with equation I, as follows:

$$Oh = \left(\eta / \sqrt{\rho \sigma D}\right)$$

(I), wherein η represents viscosity of the coating composition in pascal-seconds (Pa*s), ρ represents density of the coating composition in kilograms per cubic meter (kg/m³), σ represents surface tension of the coating composition in newtons per meter (N/m), and D is from about 0.00002 m to about 0.0004 m;

(ii) a Reynolds number (Re) of from about 0.02 to about 6,200 as determined in accordance with equation II, as follows:

$$Re = (\rho v D / \eta)$$

(II) wherein ρ represents density of the coating composition in kg/m³, v is about 1 to about 20 m/sec, D is from about 0.00002 m to about 0.0004 m, and η represents viscosity of the coating composition in Pa*s;

(iii) a Deborah number (De) of from greater than 0 to about 0.01 as determined in accordance with equation III, as follows:

$$De = \lambda / \sqrt{\rho D^3 / \sigma}$$

(III) wherein λ represents relaxation time of the coating composition in seconds(s), ρ represents density of the coating composition in kg/m³, D is from about 0.00002 m to about 0.0004 m, and σ represents surface tension of the coating composition in N/m;

(iv) a density of from about 838 kg/m³ to about 1557 kg/m³;

(v) a surface tension of from about 0.015 N/m to about 0.05 N/m;

(vi) a relaxation time of from about 0.00001 to about 1 s; or (vii) any combination of (i)-(vi).

16. A coated article prepared according to the method of claim 1.

17. The coated article of claim 16, further defined as a coated vehicle component.

18. The method of claim 1, wherein irradiating the coating composition does not substantially dry or cure the coating composition.

19. The method of claim 1, wherein irradiating the coating composition does not chemically alter the coating composition.

20. The method of claim 1, wherein the infrared emitter is configured to selectively irradiate the coating composition during application such that the irradiated coating composition is formed prior to being disposed onto the substrate.

* * * * *